United States Patent
Jun et al.

(10) Patent No.: US 11,354,241 B2
(45) Date of Patent: Jun. 7, 2022

(54) MEMORY SYSTEM

(71) Applicant: SK hynix Inc., Icheon (KR)

(72) Inventors: Jae Yung Jun, Icheon (KR); Dong Kyun Kim, Icheon (KR); Su Chang Kim, Icheon (KR); Yun Keuk Kim, Icheon (KR)

(73) Assignee: SK hynix Inc., Icheon (KR)

( * ) Notice: Subject to any disclaimer, the term of this patent is extended or adjusted under 35 U.S.C. 154(b) by 105 days.

(21) Appl. No.: 17/005,193

(22) Filed: Aug. 27, 2020

(65) Prior Publication Data

US 2021/0311872 A1    Oct. 7, 2021

(30) Foreign Application Priority Data

Apr. 3, 2020   (KR) .................. 10-2020-0040816

(51) Int. Cl.
*G06F 12/00* (2006.01)
*G06F 12/0804* (2016.01)
*G06F 12/121* (2016.01)

(52) U.S. Cl.
CPC ........ *G06F 12/0804* (2013.01); *G06F 12/121* (2013.01); *G06F 2212/1008* (2013.01); *G06F 2212/608* (2013.01)

(58) Field of Classification Search
CPC ......... G06F 12/0804; G06F 2212/1021; G06F 2212/262; G06F 2212/608
See application file for complete search history.

(56) References Cited

U.S. PATENT DOCUMENTS

| | | | | |
|---|---|---|---|---|
| 5,530,933 A | * | 6/1996 | Frink | G06F 12/0831 711/119 |
| 5,542,058 A | * | 7/1996 | Brown, III | G06F 9/383 712/E9.046 |
| 10,956,324 B1 | * | 3/2021 | Giles | G06F 12/128 |
| 2015/0161043 A1 | * | 6/2015 | Tsuchiyama | G06F 11/3034 711/102 |
| 2021/0208924 A1 | * | 7/2021 | Krueger | G06F 9/467 |

FOREIGN PATENT DOCUMENTS

KR    1020170118051 A    10/2017
KR    1020170127694 A    11/2017

* cited by examiner

*Primary Examiner* — Shawn X Gu
*Assistant Examiner* — Mohammad S Hasan

(57) ABSTRACT

A memory system may include a cache memory, a nonvolatile memory, a write back wait queue, and a controller. To evict an eviction cache entry including a target transaction ID from the memory cache to the nonvolatile memory, the controller performs write back operations on cache entries respectively corresponding to waiting entries at a head of the write back wait queue until a waiting entry including the target transaction ID arrives at the head of the write back wait queue, and then performs a write back operation on the eviction cache entry.

19 Claims, 25 Drawing Sheets

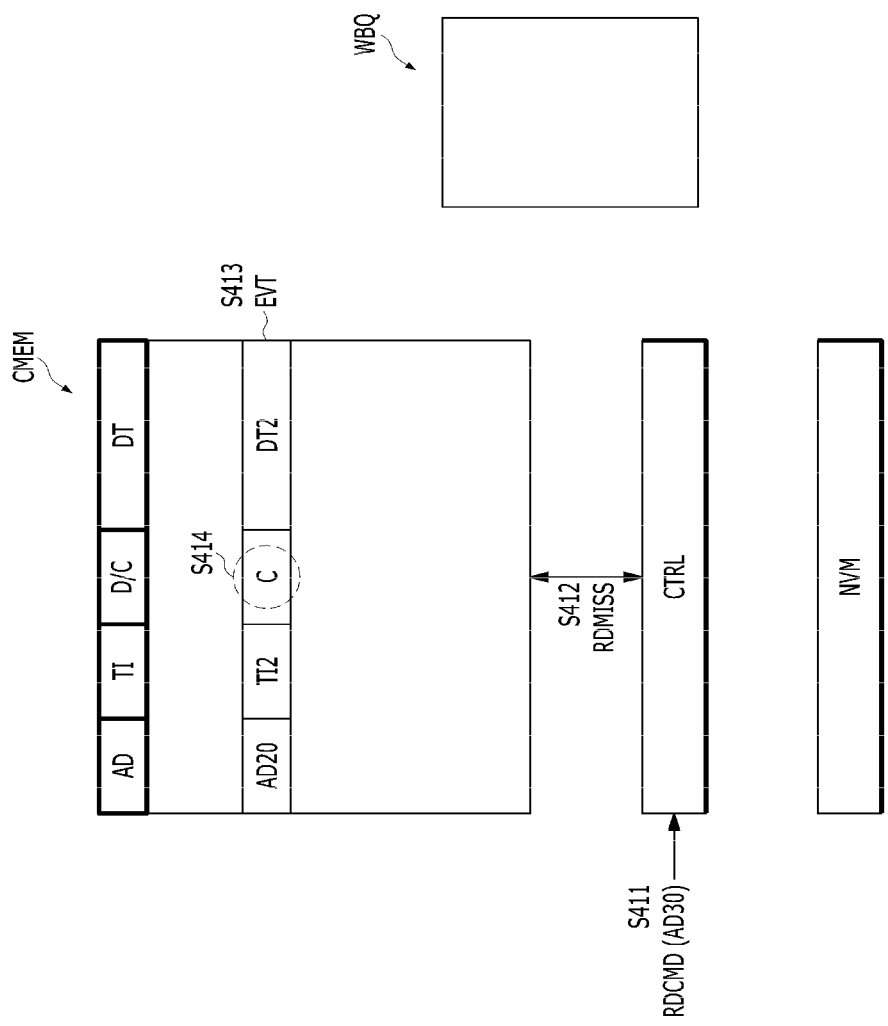

MEMORY SYSTEM

CROSS-REFERENCES TO RELATED APPLICATION

The present application claims priority under 35 U.S.C. § 119(a) to Korean application number 10-2020-0040816, filed on Apr. 3, 2020, in the Korean Intellectual Property Office, which is incorporated herein by reference in its entirety.

BACKGROUND

1. Technical Field

Various embodiments generally relate to a memory system, and more particularly, to a memory system including a nonvolatile memory.

2. Related Art

A memory system may be configured to store data provided from a host device, in response to a write request of the host device. Furthermore, the memory system may be configured to provide data stored therein to the host device, in response to a read request of the host device. The host device refers to an electronic device capable of processing data, and may include a computer, a digital camera, a mobile phone or the like. The memory system may be embedded in the host device or separately fabricated and connected to the host device.

SUMMARY

Various embodiments are directed to a memory system capable of performing an enhanced write back operation.

In an embodiment, a memory system may include: a cache memory configured to store a plurality of cache entries; a nonvolatile memory; and a controller configured to evict from the cache memory an eviction cache entry having a target transaction ID by: when a first waiting entry at a head of a write back wait queue includes a transaction ID that is different from the target transaction ID, performing a write back operation to the nonvolatile memory on a cache entry corresponding to the first waiting entry, and when the first waiting entry at the head of the write back wait queue includes the transaction ID equal to the target transaction ID, performing a write back operation to the nonvolatile memory on the eviction cache entry.

In an embodiment, a memory system may include: a cache memory configured to store a plurality of cache entries; a nonvolatile memory configured to store data; and a controller configured to, in response to a command: perform a comparison operation comprising comparing a transaction ID of a first waiting entry at a head of a write back wait queue to a transaction ID of an eviction cache entry of the cache memory, perform a cache entry determination comprising determining a cache entry in the cache memory according to the comparison result, and perform a write back operation comprising performing the write back operation to the nonvolatile memory on the determined cache entry.

In an embodiment, a memory system may include: a cache memory configures to store a plurality of cache entries; a nonvolatile memory; and a controller configured to: enqueue a waiting entry corresponding to a cache entry into a write back wait queue when storing the cache entry in the cache memory in response to a write command, and perform a write back operation on the cache entry based on the write back wait queue, wherein each of the cache entry and the waiting entry comprises a transaction ID of the write command.

In accordance with the present embodiments, the memory system can perform the enhanced write back operation.

BRIEF DESCRIPTION OF THE DRAWINGS

FIGS. 4A and 4B illustrate an operating process of the memory system in case of a read miss in accordance with an embodiment.

DETAILED DESCRIPTION

Figure 1:
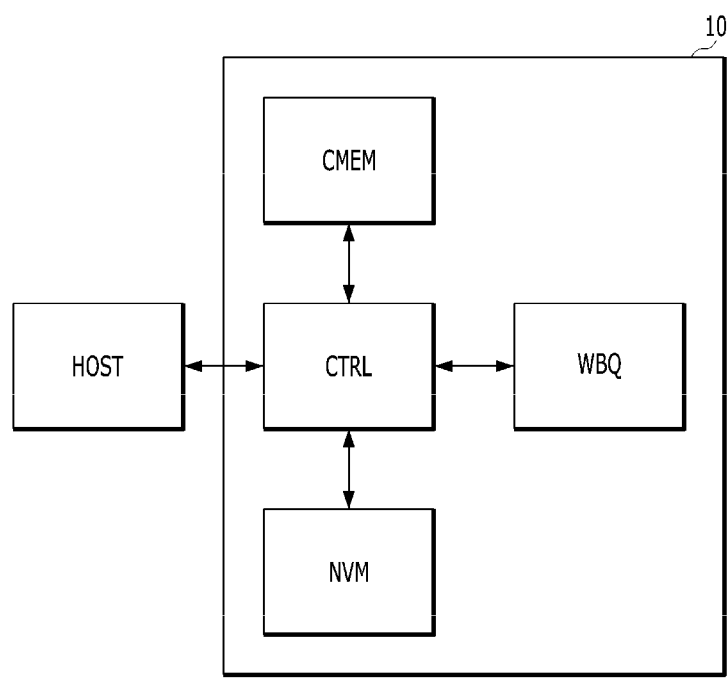
FIG. 1 illustrates a memory system in accordance with an embodiment.

The advantages and characteristics of the present disclosure and a method for achieving the advantages and characteristics will be described through embodiments described below in detail with reference to the accompanying drawings. However, the present disclosure is not limited to the embodiments described herein, but may be embodied in different manners. The present embodiments are only provided to describe the present disclosure in detail, such that the technical spirit of the present disclosure can be easily carried out by those skilled in the art to which the present disclosure pertains.

The present embodiments are not limited to specific shapes illustrated in the drawings, but may be exaggerated for clarity. In this specification, specific terms are used. However, the terms are only used to describe the present disclosure, and are not used to restrict the meaning thereof or limit the scope of the present disclosure, described in claims.

In this specification, an expression such as 'and/or' indicates including one or more of components listed before/after the expression. Moreover, an expression such as 'connected/coupled' indicates that one element is directly connected/coupled to another element or indirectly connected/coupled to the another element through still another element. The terms of a singular form includes plural forms unless referred to the contrary. Furthermore, the meanings of 'include' and 'comprise' or 'including' and 'comprising' may specify a component, step, operation and element, and do not exclude the presence or addition of one or more other components, steps, operations and elements.

Hereafter, embodiments will be described in detail with reference to the drawings.

FIG. 1 is a block diagram illustrating a memory system 10 in accordance with an embodiment.

Referring to FIG. 1, the memory system 10 may be configured to store data provided from an external host HOST, in response to a write command of the host HOST. Furthermore, the memory system 10 may be configured to provide data stored therein to the host HOST, in response to a read request of the host HOST.

According to an embodiment, the memory system 10 may include a PCMCIA (Personal Computer Memory Card International Association) card, CF (Compact Flash) card, smart media card, memory stick, various multimedia cards (MMC, eMMC, RS-MMC and MMC-micro), SD (Secure Digital) card (SD, Mini-SD, Micro-SD), UFS (Universal Flash Storage), SSD (Solid State Drive) or the like.

According to an embodiment, the memory system 10 may include a desktop computer, a notebook computer, a tablet PC, a digital camera, a smart TV or a mobile phone.

The memory system 10 may include a controller CTRL, a cache memory CMEM, a write back wait queue WBQ and a nonvolatile memory NVM.

The controller CTRL may control overall operations of the memory system 10. The controller CTRL may control the nonvolatile memory NVM to perform a foreground operation according to an instruction of the host HOST. The foreground operation may include an operation of writing data to the nonvolatile memory NVM or reading data from the nonvolatile memory NVM according to an instruction from the host HOST, i.e. a write command or read command.

The controller CTRL may control the nonvolatile memory NVM, independently of the host HOST, to perform a background operation which is internally required. The background operation may include one or more of a wear-leveling operation, a garbage collection operation, an erase operation, a read reclaim operation and a refresh operation on the nonvolatile memory NVM. The background operation, like a foreground operation, may include an operation of writing data to the nonvolatile memory NVM, an operation of reading data from the nonvolatile memory NVM, or both.

In response to a command from the host HOST, the controller CTRL may first access the cache memory CMEM before accessing the nonvolatile memory NVM. As will be described below, the cache memory CMEM may include a plurality of cache entries stored in a plurality of cache areas, respectively. Each of the cache entries may include an address and data corresponding to the address. Hereinafter, data requested through a read or write command is defined as target data, and an address corresponding to the target data, i.e., an address included in the read or write command, is defined as a target address. Furthermore, a cache entry including the target address of the read or write command is defined as a target cache entry.

A process in which the controller CTRL accesses the cache memory CMEM will be described in detail as follows. When receiving a read command including a target address from the host HOST, the controller CTRL may search the cache memory CMEM for a target cache entry including the target address. When the target cache entry is present in the cache memory CMEM (i.e., a read hit occurs), the controller CTRL may transmit data included in the target cache entry as target data to the host HOST. When the target cache entry is not present in the cache memory CMEM (i.e., a read miss occurs), the controller CTRL may read the target data corresponding to the target address from the nonvolatile memory NVM, and store the target address and the target data in an empty cache area of the cache memory CMEM. The controller CTRL may then read the target data from the cache memory CMEM and transmit the read target data to the host HOST.

When receiving a write command including a target address and target data from the host HOST, the controller CTRL may search the cache memory CMEM for a target cache entry including the target address. When the target cache entry is present in the cache memory CMEM (i.e., a write hit occurs), the controller CTRL may replace data of the target cache entry with the target data. When the target cache entry is not present in the cache memory CMEM (i.e., a write miss occurs), the controller CTRL may read data corresponding to the target address from the nonvolatile memory NVM, and store the target address and the read data as the target cache entry in an empty cache area of the cache memory CMEM. The controller CTRL may then replace data of the target cache entry with the target data.

As described above, the target data of the write command may be temporarily stored in the cache memory CMEM before being stored in the nonvolatile memory NVM. The target data of the write command may be migrated to the nonvolatile memory NVM from the cache memory CMEM through a write back operation. When the write back operation is not yet performed on the target data of the write command, the controller CTRL may mark the cache entry including the corresponding target data as being in a dirty state. After the write back operation is performed on the target data of the write command the controller CTRL may mark the cache entry including the corresponding target data as being in a clean state.

When the target data of a read or write command is to be stored in the cache memory CMEM with no empty cache area, the controller CTRL may evict one or more cache entries from the cache memory CMEM. The controller CTRL may select a cache entry to be evicted (hereinafter, eviction cache entry) or a cache area in which the eviction cache entry is stored (hereinafter, referred to as an eviction cache area) according to various policies. For example, the controller CTRL may select a less necessary or less important cache entry as the eviction cache entry.

When the eviction cache entry is in the dirty state, the controller CTRL may treat the eviction cache area as an empty cache area only after performing a write back operation on the eviction cache entry. However, when the eviction cache entry is in a clean state, the controller CTRL may immediately treat the eviction cache area as an empty cache area without performing a write back operation on the eviction cache entry.

The host HOST may process data on a transaction basis. A single transaction may be processed through a plurality of write commands. When transmitting a write command including a transaction ID to the controller CTRL, the host HOST may also transmit the transaction ID corresponding to the write command to the controller CTRL. The transaction ID may be included in a target cache entry with a target address and target data.

As a result, data corresponding to different transactions may be stored in the cache memory CMEM. In embodiments, due to the atomicity of the transactions, the data corresponding to the different transactions need to be written back to the nonvolatile memory NVM according to the order in which the data are transmitted from the host HOST (hereinafter, referred to as a write order). However, data corresponding to the same transaction may be written back to the nonvolatile memory NVM regardless of the write order.

The controller CTRL may manage the write back wait queue WBQ to fulfill these ordering requirements. When temporarily storing the target data of the write command in the cache memory CMEM, the controller CTRL may store the target address and the transaction ID as the target cache entry in the cache memory CMEM, and also enqueue a corresponding waiting entry into the write back wait queue WBQ. The waiting entry may include the same target address and transaction ID as those of the target cache entry.

The write back wait queue WBQ may operate in a first-in-first-out (FIFO) manner. Therefore, the order in which waiting entries are enqueued into the write back wait queue WBQ may indicate the order in which cache entries corresponding to the respective waiting entries need to be written back. Thus, the controller CTRL may sequentially process the waiting entries of the write back wait queue WBQ, thereby guaranteeing the write order required by the transactions.

When the controller CTRL needs to perform a write back operation on the eviction cache entry of the cache memory CM EM, the controller CTRL may first refer to a waiting entry (hereinafter, head waiting entry) positioned at the head of the write back wait queue WBQ. In some cases, the controller CTRL may first perform the write back operation on a cache entry corresponding to the head waiting entry before performing the write back operation on the eviction cache entry. Specifically, the controller CTRL may first perform a write back operation on the cache entry corresponding to the head waiting entry, until a waiting entry including the transaction ID of the eviction cache entry arrives at the head of the write back wait queue WBQ. In other words, the controller CTRL may preferentially perform the write back operation on a waiting entry having a different transaction ID from the eviction cache entry, among waiting entries leading the waiting entry corresponding to the eviction cache entry in the write back wait queue WBQ.

More specifically, when the transaction ID of the head waiting entry is different from the transaction ID of the eviction cache entry, then before performing the write back operation on the eviction cache entry, the controller CTRL may perform the write back operation on the cache entry corresponding to the head waiting entry. The controller CTRL may then dequeue the head waiting entry from the write back wait queue WBQ after performing the write back operation on the cache entry corresponding to the head waiting entry. The controller CTRL may then repeat the above-described process on a new head waiting entry. In this manner, the write order of the transactions may be guaranteed.

When the transaction ID of the head waiting entry is equal to the transaction ID of the eviction cache entry, the controller CTRL may then perform the write back operation on the eviction cache entry. In this case, although the waiting entry corresponding to the eviction cache entry came later than the head waiting entry in the write back wait queue WBQ, the write back operation on the eviction cache entry is performed first, and the write back operation on the cache entry corresponding to the head waiting entry is performed later. This is possible because when the cache entry corresponding to the head waiting entry corresponds to the same transaction as the eviction cache entry, the cache entry corresponding to the head waiting entry may be written back in a different order from the write order. Therefore, as the write back operation which does not need to be immediately performed is postponed, the overhead of the memory system 10 may be reduced.

According to an embodiment, the controller CTRL may perform the write back operation on the cache entry corresponding to the head waiting entry of the write back wait queue WBQ, and dequeue the head waiting entry from the write back wait queue WBQ, during an idle time.

FIG. 1 illustrates the case in which the write back wait queue WBQ is present in a separate memory, but embodiments are not limited thereto. In an embodiment, the write back wait queue WBQ may be included in the controller CTRL or the cache memory CMEM.

The cache memory CMEM may include a plurality of cache areas, and the plurality of cache areas may store cache entries, respectively. The cache area may correspond to a memory unit for storing the corresponding cache entry. The cache entry may include data and a tag corresponding to the data. The tag may include an address, a transaction ID, and a dirty/clean-state mark, which correspond to the data.

The cache memory CMEM may include a volatile memory. The volatile memory may include a DRAM (Dynamic Random Access Memory) or SRAM (Static Random Access Memory). The cache memory CMEM may operate at higher speed than the nonvolatile memory NVM.

The nonvolatile memory NVM may store data under control of the controller CTRL.

The nonvolatile memory NVM may be directly coupled to the cache memory CMEM. In this case, data may be migrated between the cache memory CMEM and the nonvolatile memory NVM without passing through the controller CTRL. According to an embodiment, data may be migrated between the cache memory CMEM and the nonvolatile memory NVM through the controller CTRL.

The nonvolatile memory NVM may include a flash memory device such as NAND flash or NOR flash, FeRAM (Ferroelectric Random Access Memory), PCRAM (Phase-Change Random Access Memory), MRAM (Magnetic Random Access Memory) or ReRAM (Resistive Random Access Memory).

The nonvolatile memory NVM may include one or more planes, one or more memory chips, one or more memory dies or one or more memory packages.

Figure 2:
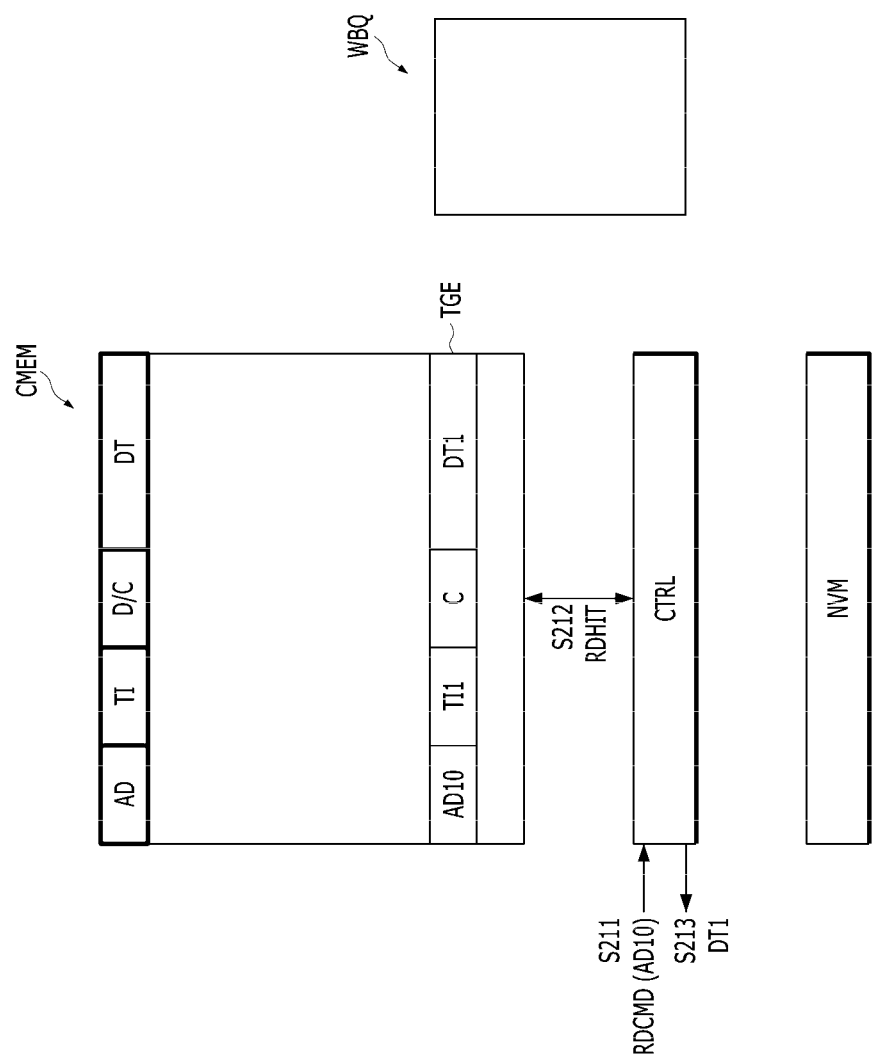
FIG. 2 illustrates an operating process of the memory system in case of a read hit in accordance with an embodiment.

FIG. 2 is a diagram illustrating an operating process of the memory system 10 in case of a read hit RDHIT in accordance with an embodiment. Referring to FIG. 2, each of cache entries of the cache memory CMEM may include a tag and data DT, the tag including an address AD, a transaction ID TI and a dirty/clean-state mark D/C.

In step S211, the controller CTRL may receive a read command RDCMD from the host HOST. The read command RDCMD may correspond to a target address AD10.

In step S212, the controller CTRL may determine that a read hit RDHIT occurred when a target cache entry TGE including the target address AD10 is present in the cache memory CMEM.

In step S213, the controller CTRL may transmit target data DT1, included in the target cache entry TGE, to the host HOST.

Figure 3A:
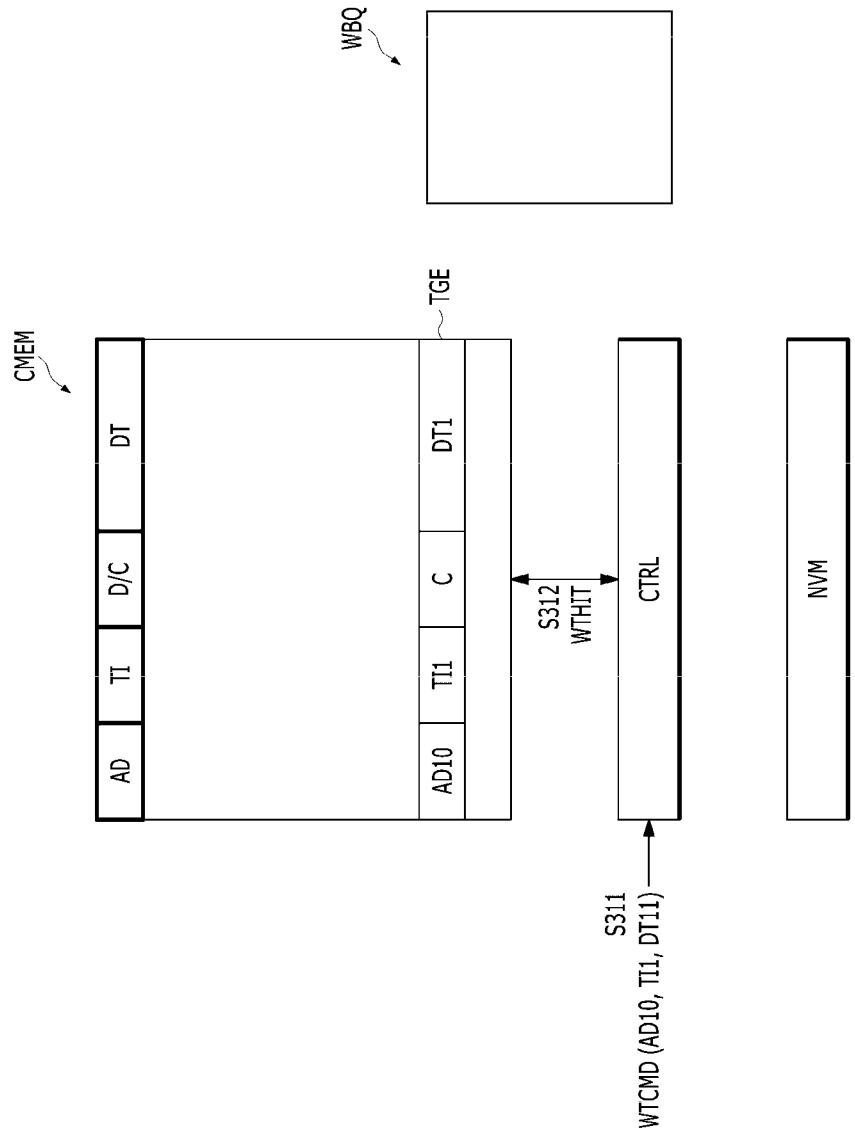
FIGS. 3A and 3B illustrate an operating process of the memory system in case of a write hit in accordance with an embodiment.
Figure 3B:
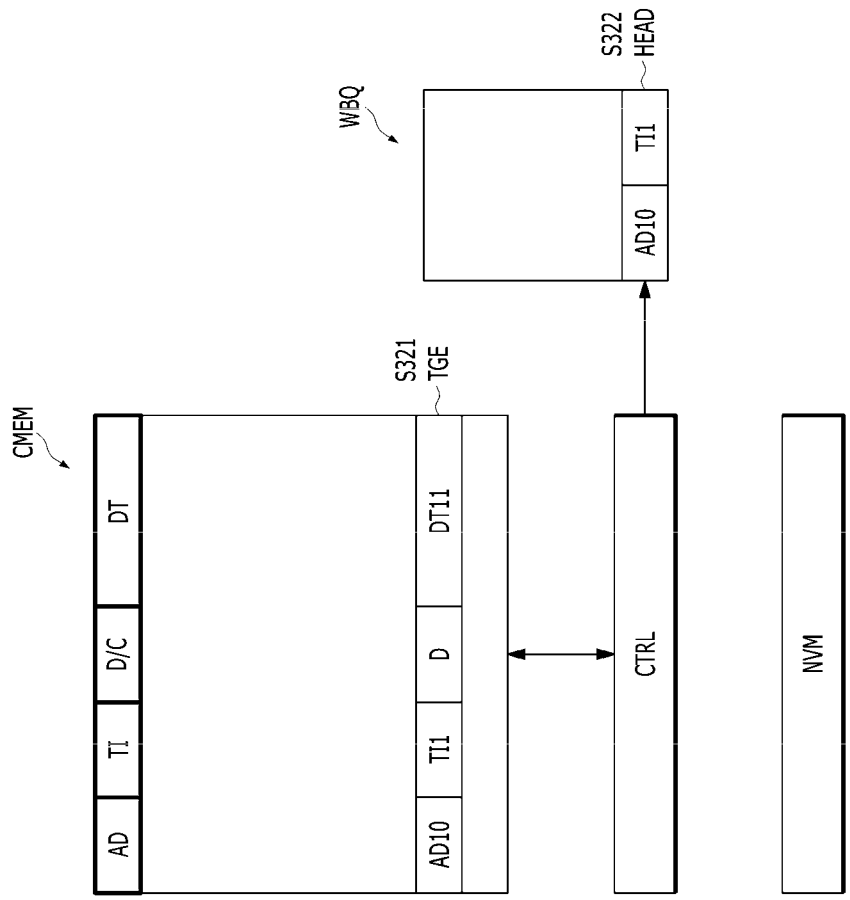

FIGS. 3A and 3B are diagrams illustrating an operating process of the memory system 10 in case of a write hit WTHIT in accordance with an embodiment.

Referring to FIG. 3A, the controller CTRL may receive a write command WTCMD from the host HOST in step S311. The write command WTCMD may correspond to the target address AD10 and target data DT11. Furthermore, the write command WTCMD may correspond to a transaction ID TI1.

In step S312, the controller CTRL may determine that the write hit WTHIT occurred when the target cache entry TGE including the target address AD10 is present in the cache memory CMEM.

Then, referring to FIG. 3B, the controller CTRL may replace some or all of the data DT1 of the target cache entry TGE with the target data DT11, and mark the target cache entry TGE as being in the dirty state D, in step S321. When the target cache entry TGE is already marked as being in the dirty state D (unlike the state illustrated in FIG. 3B), the controller CTRL may retain the mark of being in the dirty state D. The controller CTRL may also store the transaction ID TI1 in the cache area of the target cache entry TGE.

In step S322, the controller CTRL may enqueue a waiting entry HEAD corresponding to the target cache entry TGE into the write back wait queue WBQ. The waiting entry HEAD may include the target address AD10 and the transaction ID TI1.

FIG. 3B illustrates that the waiting entry HEAD is enqueued as the head waiting entry into the write back wait queue WBQ. However, when another waiting entry is already present in the write back wait queue WBQ, the waiting entry HEAD may be enqueued into the write back wait queue WBQ following the another waiting entry (for example, at a tail of the write back wait queue WBQ).

Figure 4B:
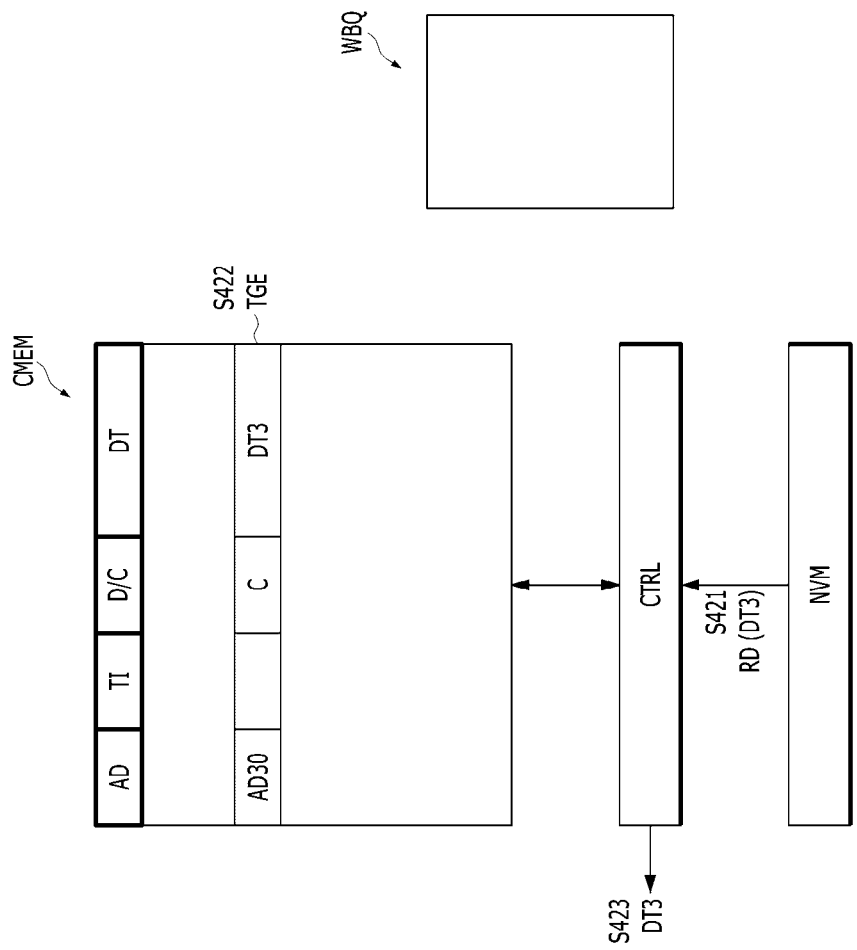

FIGS. 4A and 4B are diagrams illustrating an operating process of the memory system 10 in case of a read miss RDMISS in accordance with an embodiment.

Referring to FIG. 4A, the controller CTRL may receive a read command RDCMD from the host HOST in step S411. The read command RDCMD may correspond to a target address AD30.

In step S412, the controller CTRL may determine that the read miss RDMISS occurred when a target cache entry including the target address AD30 is not present in the cache memory CMEM. In the example of FIGS. 4A and 4B, it is assumed that the cache memory CMEM is full.

In step S413, the controller CTRL may select an eviction cache entry EVT according to an eviction policy. As described above, the controller CTRL may determine the eviction cache entry EVT according to various policies.

In step S414, the controller CTRL may determine that the eviction cache entry EVT is in the clean state C, by referring to the dirty/clean-state mark D/C of the eviction cache entry EVT. Therefore, the controller CTRL may determine that no write back operation needs to be performed on the eviction cache entry EVT. The controller CTRL may directly immediately treat the eviction cache area, in which the eviction cache entry EVT is stored, as an empty cache area.

Then, referring to FIG. 4B, the controller CTRL may perform a read operation RD to read target data DT3 corresponding to the target address AD30 from the nonvolatile memory NVM, in step S421.

In step S422, the controller CTRL may store the target address AD30 and the target data DT3 in the empty cache area in which the eviction cache entry EVT had been stored. In the corresponding cache area, the target cache entry TGE including the target address AD30 is stored. The target cache entry TGE may include no transaction ID (for example, the Transaction ID stored in the target cache entry TGE may be a value indicating that the target cache entry TGE is not associated with any transaction).

In step S423, the controller CTRL may transmit the target data DT3, included in the target cache entry TGE, to the host HOST.

Figure 5A:
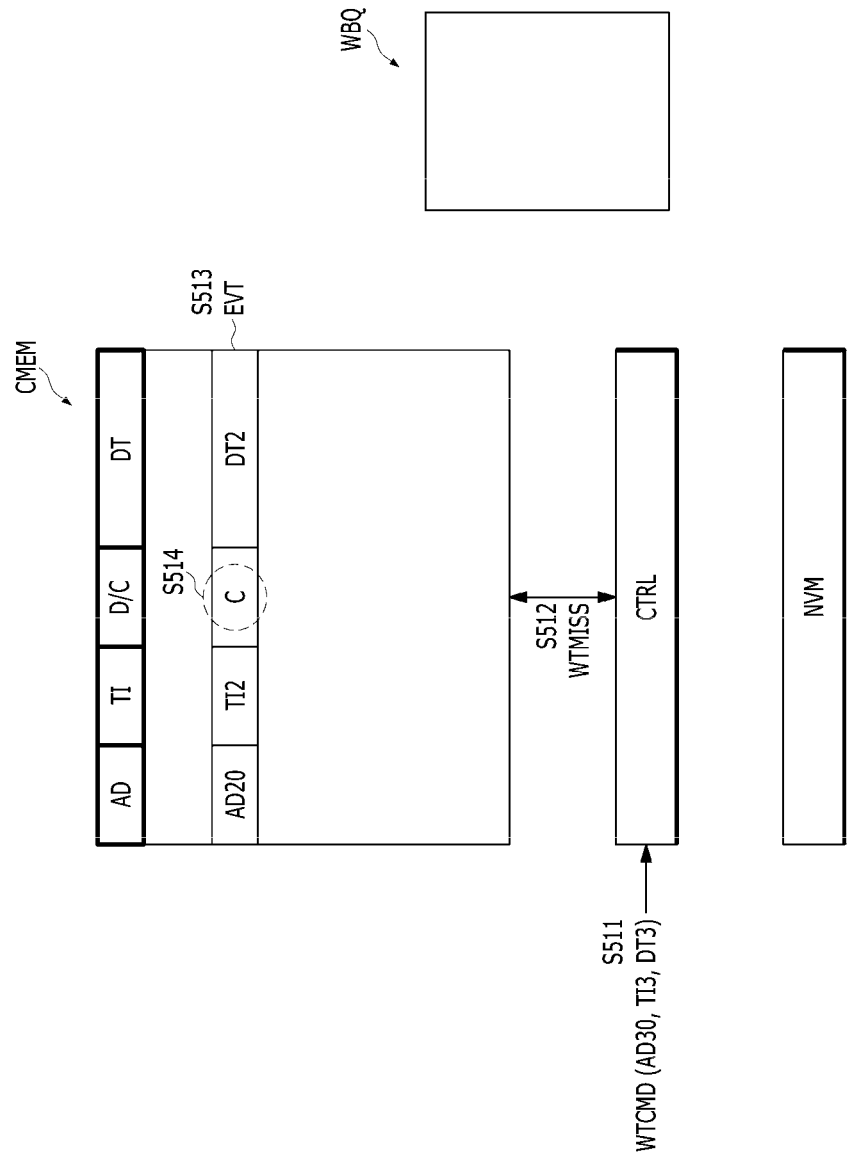
FIGS. 5A, 5B, and 5C illustrate an operating process of the memory system in case of a write miss in accordance with an embodiment.
Figure 5B:
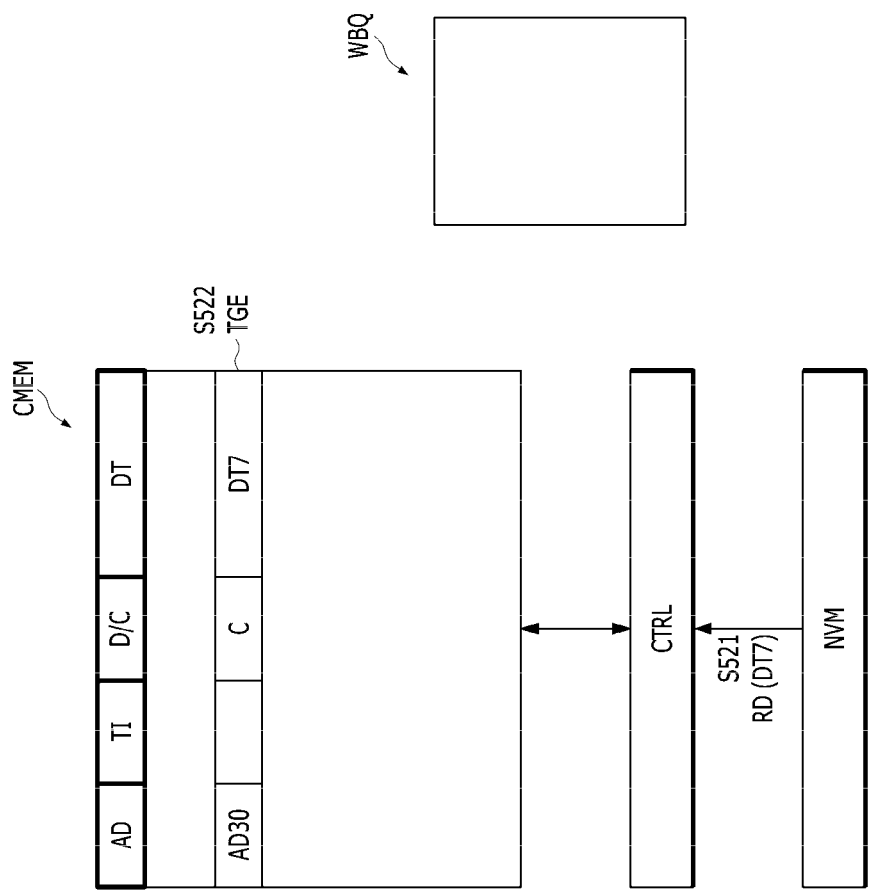
Figure 5C:
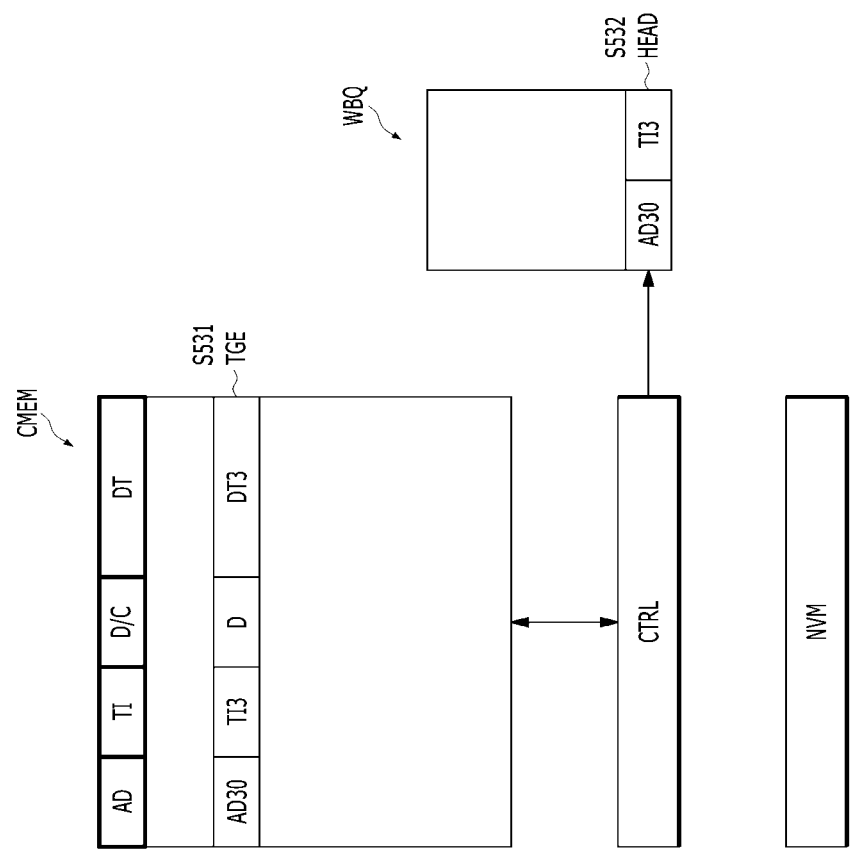

FIGS. 5A to 5C are diagrams illustrating an operating process of the memory system 10 in case of a write miss WTMISS in accordance with an embodiment.

Referring to FIG. 5A, the controller CTRL may receive a write command WTCMD from the host HOST in step S511. The write command WTCMD may correspond to the target address AD30 and the target data DT3. Furthermore, the write command WTCMD may correspond to a transaction ID TI3.

In step S512, the controller CTRL may determine that the write miss WTMISS occurred when a target cache entry including the target address AD30 is not present in the cache memory CMEM. In the example of FIGS. 5A to 5C, it is assumed that the cache memory CMEM is full.

In step S513, the controller CTRL may select an eviction cache entry EVT according to an eviction policy.

In step S514, the controller CTRL may determine that the eviction cache entry EVT is in the clean state C, by referring to the dirty/clean-state mark D/C of the eviction cache entry EVT. Therefore, the controller CTRL may determine that no write back operation needs to be performed on the eviction cache entry EVT. The controller CTRL may consider the eviction cache area, in which the eviction cache entry EVT is stored, to be an empty cache area without performing a write back operation on the eviction cache entry EVT.

Then, referring to FIG. 5B, the controller CTRL may perform the read operation RD to read data DT7 corresponding to the target address AD30 from the nonvolatile memory NVM, in step S521. The data DT7 may include old data corresponding to the target address AD30.

In step S522, the controller CTRL may store the target address AD30 and the data DT7 in the empty cache area in which the eviction cache entry EVT had been stored. In the corresponding cache area, the target cache entry TGE including the target address AD30 is stored.

Then, referring to FIG. 5C, the controller CTRL may replace some or all of the data DT7 of the target cache entry TGE with the target data DT3, and mark the target cache entry TGE as being in the dirty state D, in step S531. The controller CTRL may also store the transaction ID TI3 in the cache area of the target cache entry TGE.

In step S532, the controller CTRL may enqueue a waiting entry HEAD corresponding to the target cache entry TGE into the write back wait queue WBQ. The waiting entry HEAD may include the target address AD30 and the transaction ID TI3.

Figure 6A:
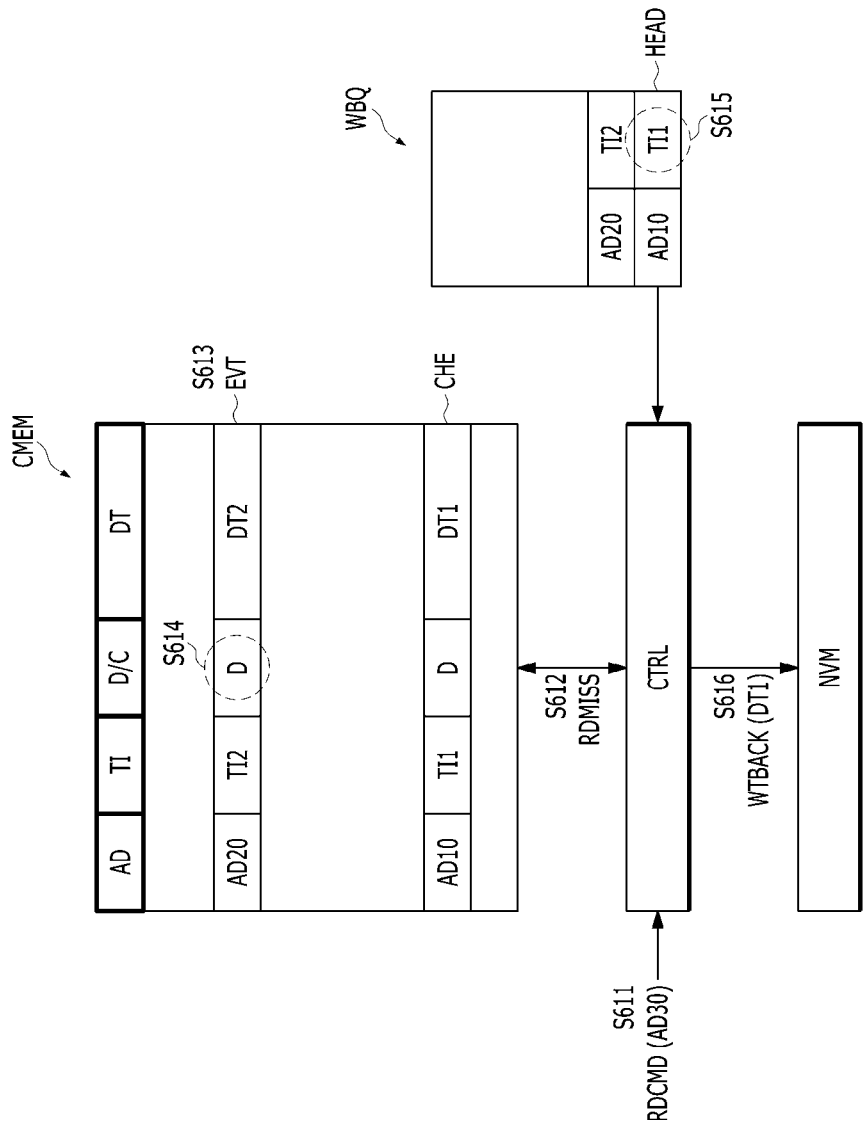
FIGS. 6A, 6B, and 6C illustrate an operating process of the memory system in case of a read miss in accordance with an embodiment.
Figure 6B:
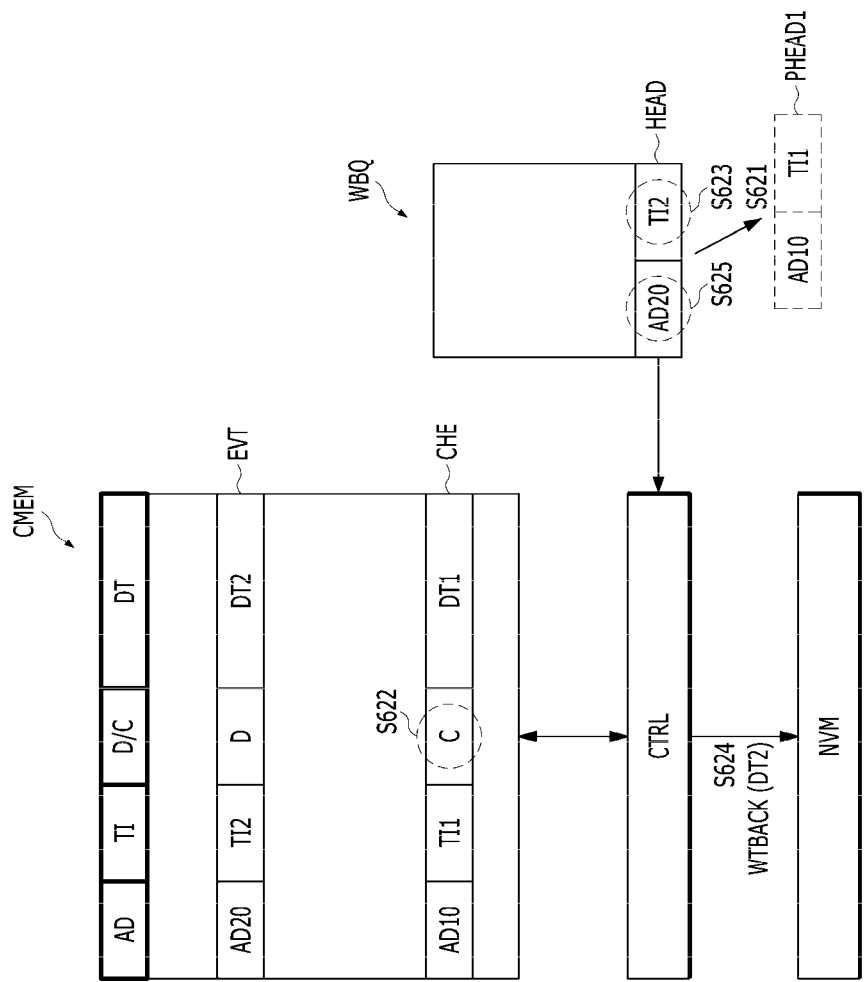
Figure 6C:
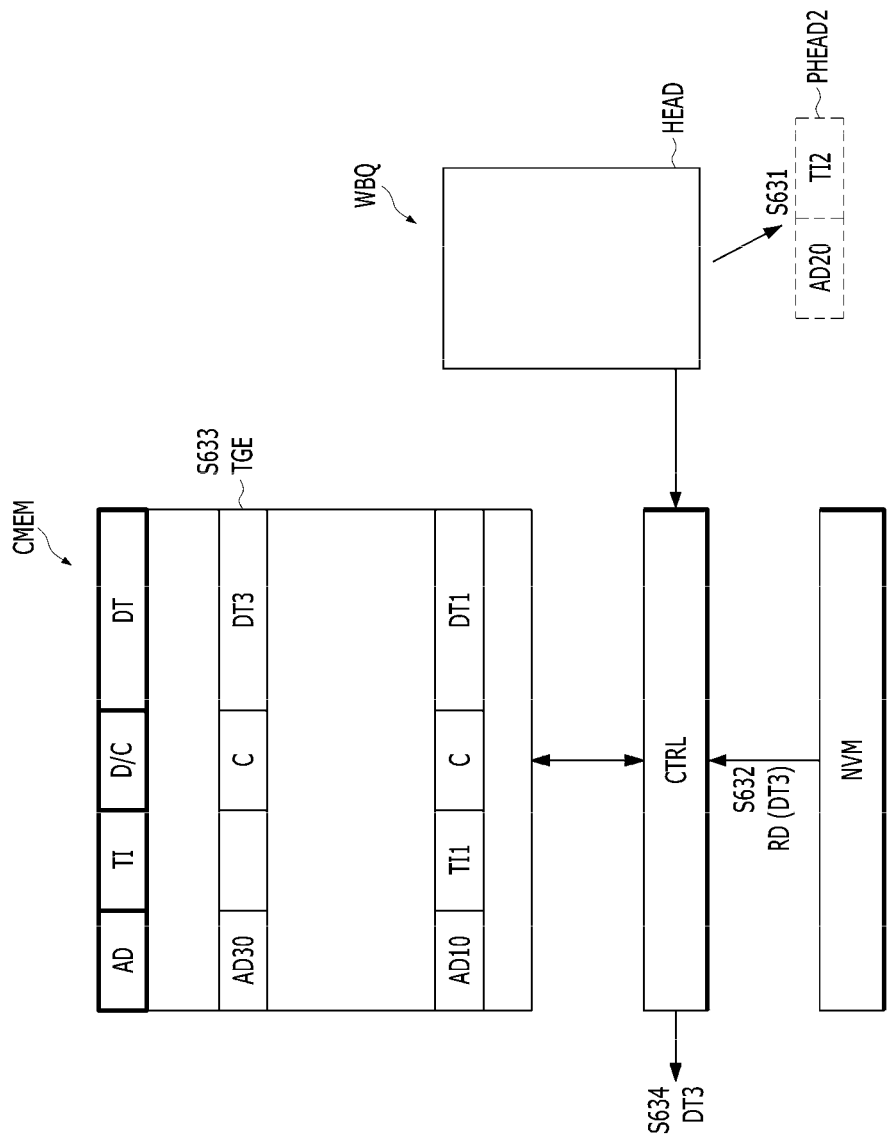

FIGS. 6A to 6C are diagrams illustrating an operating process of the memory system 10 in case of a read miss RDMISS in accordance with an embodiment.

Referring to FIG. 6A, the controller CTRL may receive a read command RDCMD from the host HOST in step S611. The read command RDCMD may correspond to the target address AD30.

In step S612, the controller CTRL may determine that the read miss RDMISS occurred when a target cache entry including the target address AD30 is not present in the cache memory CMEM. In the example of FIGS. 6A to 6C, it is assumed that the cache memory CMEM is full.

In step S613, the controller CTRL may select an eviction cache entry EVT according to the eviction policy.

In step S614, the controller CTRL may determine that the eviction cache entry EVT is in the dirty state D, by referring to the dirty/clean-state mark D/C of the eviction cache entry EVT. Therefore, the controller CTRL may determine to perform a write back operation on the eviction cache entry EVT.

In step S615, the controller CTRL may compare the transaction ID TI1 of the head waiting entry HEAD of the write back wait queue WBQ to the transaction ID TI2 of the eviction cache entry EVT. That is, in order to maintain the write order of transactions, the controller CTRL may check the write back wait queue WBQ before writing back the eviction cache entry EVT. In the illustrated example, the controller CTRL may determine that the transaction ID TI1 of the head waiting entry HEAD is different from the transaction ID TI2 of the eviction cache entry EVT.

In step S616, the controller CTRL may perform a write back operation WTBACK on a cache entry CHE corresponding to the head waiting entry HEAD. The cache entry CHE corresponding to the head waiting entry HEAD may include the same address as the head waiting entry HEAD. The controller CTRL may store the data DT1 in the nonvolatile memory NVM.

Referring to FIG. 6B, the controller CTRL may dequeue a head waiting entry PHEAD1 corresponding to the written-back cache entry CHE from the write back wait queue WBQ in step S621.

In step S622, the controller CTRL may mark the written-back cache entry CHE as being in the clean state C.

In step S623, the controller CTRL may compare the transaction ID TI2 of the head waiting entry HEAD of the write back wait queue WBQ to a transaction ID TI2 of the eviction cache entry EVT. That is, in order to maintain the write order of transactions, the controller CTRL may refer to the write back wait queue WBQ before writing back the eviction cache entry EVT. In the illustrated example, the controller CTRL may determine that the transaction ID TI2 of the head waiting entry HEAD is equal to the transaction ID TI2 of the eviction cache entry EVT.

Accordingly, in step S624, the controller CTRL may perform the write back operation WTBACK on the eviction cache entry EVT. That is, the controller CTRL may store data DT2 in the nonvolatile memory NVM and mark the eviction cache entry EVT as clean (or, in another embodiment, as empty).

In step S625, the controller CTRL may compare an address AD20 of the head waiting entry HEAD to an address AD20 of the eviction cache entry EVT. In other words, the controller CTRL may determine whether the head waiting entry HEAD corresponds to the eviction cache entry EVT. The controller CTRL may perform this operation to determine whether to dequeue the head waiting entry HEAD from the write back wait queue WBQ after performing the write back operation WTBACK on the eviction cache entry EVT. In the illustrated example, the controller CTRL may determine that the address AD20 of the head waiting entry HEAD is equal to the address AD20 of the eviction cache entry EVT. In other words, the controller CTRL may determine that the head waiting entry HEAD corresponds to the eviction cache entry EVT.

In response, referring to FIG. 6C, the controller CTRL may dequeue a head waiting entry PHEAD2 corresponding to the written-back eviction cache entry EVT from the write back wait queue WBQ in step S631.

In step S632, the controller CTRL may perform the read operation RD to read the target data DT3 corresponding to the target address AD30 from the nonvolatile memory NVM.

In step S633, the controller CTRL may store the target address AD30 and the target data DT3 in the empty cache area in which the eviction cache entry EVT had been stored. In the corresponding cache area, the target cache entry TGE including the target address AD30 is stored.

In step S634, the controller CTRL may transmit the target data DT3, included in the target cache entry TGE, to the host HOST.

FIG. 6A illustrates the case in which only one waiting entry HEAD is present ahead of the waiting entry corresponding to the eviction cache entry EVT in the write back wait queue WBQ. However, when a plurality of waiting entries are present ahead of the waiting entry corresponding to the eviction cache entry EVT in the write back wait queue WBQ, the procedure of steps S615, S616, S621 and S622 may be repeated in the same manner.

FIG. 6A illustrates a situation in which it is determined in step S615 that the transaction ID TI1 of the head waiting entry HEAD is different from the transaction ID TI2 of the eviction cache entry EVT. However, when it is determined in step S615 that the transaction ID of the head waiting entry HEAD is equal to the transaction ID TI2 of the eviction cache entry EVT, the procedure may be performed in the same manner but with step S624 immediately following step S615.

Figure 7A:
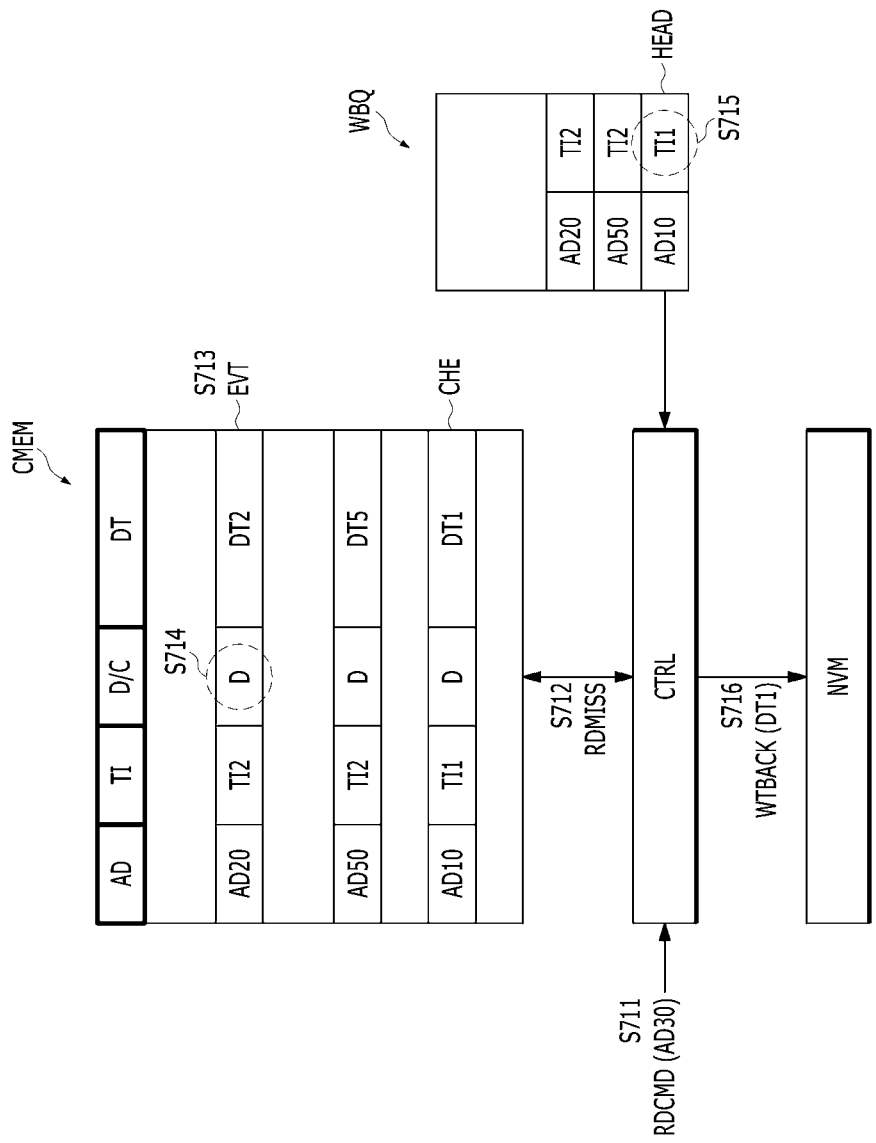
FIGS. 7A, 7B, and 7C illustrate an operating process of the memory system in case of a read miss in accordance with an embodiment.
Figure 7B:
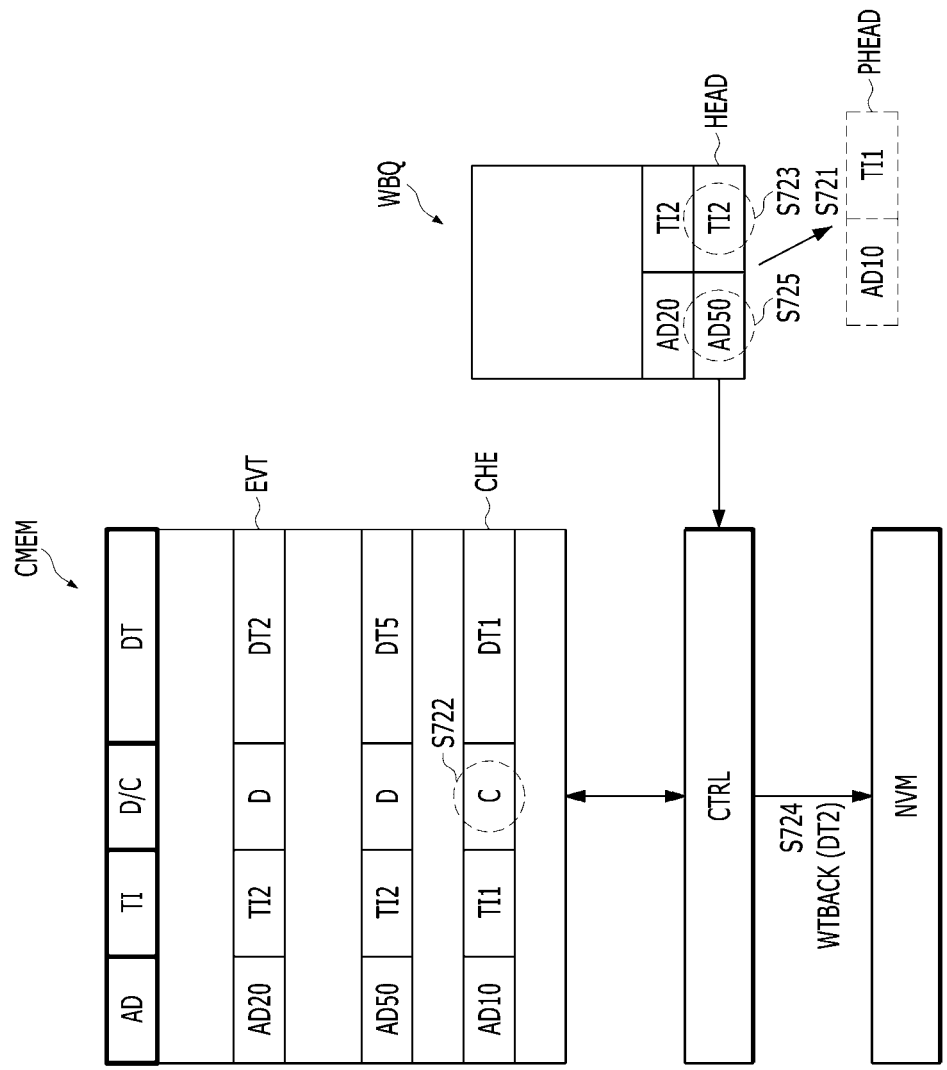
Figure 7C:
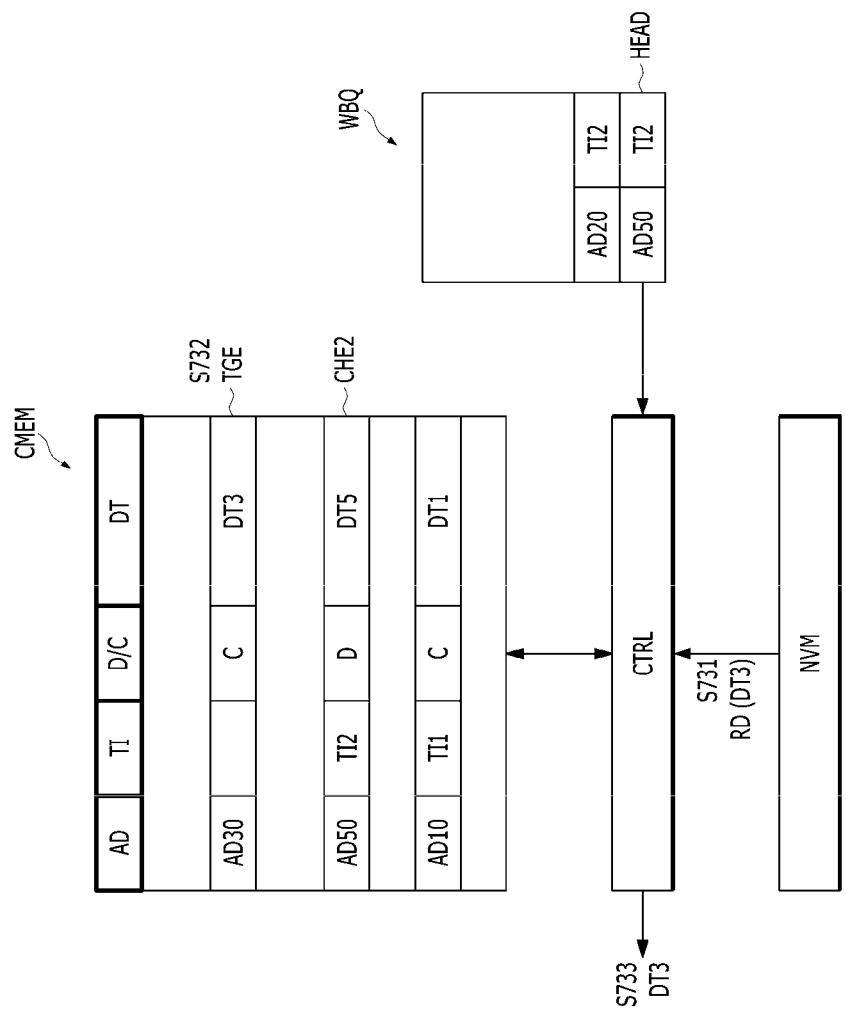

FIGS. 7A to 7C are diagrams illustrating an operating process of the memory system 10 in case of a read miss RDMISS in accordance with an embodiment.

Referring to FIG. 7A, the controller CTRL may receive the read command RDCMD from the host HOST in step S711. The read command RDCMD may correspond to the target address AD30.

In step S712, the controller CTRL may determine that the read miss RDMISS occurred when a target cache entry including the target address AD30 is not present in the cache memory CMEM. In the example of FIGS. 7A to 7C, it is assumed that the cache memory CMEM is full.

In step S713, the controller CTRL may select an eviction cache entry EVT according to the eviction policy.

In step S714, the controller CTRL may determine that the eviction cache entry EVT is in the dirty state D by referring to the dirty/clean-state mark D/C of the eviction cache entry EVT. Therefore, the controller CTRL may determine to perform the write back operation WTBACK on the eviction cache entry EVT.

In step S715, the controller CTRL may compare the transaction ID TI1 of the head waiting entry HEAD of the write back wait queue WBQ to the transaction ID TI2 of the eviction cache entry EVT. That is, in order to maintain the write order of transactions, the controller CTRL may refer to the write back wait queue WBQ before writing back the eviction cache entry EVT. In the illustrated example, the controller CTRL may determine that the transaction ID TI1 of the head waiting entry HEAD is different from the transaction ID TI2 of the eviction cache entry EVT.

Accordingly, in step S716, the controller CTRL may perform the write back operation WTBACK on the cache entry CHE corresponding to the head waiting entry HEAD. That is, the controller CTRL may store the data DT1 in the nonvolatile memory NVM.

Referring to FIG. 7B, the controller CTRL may then dequeue a head waiting entry PHEAD corresponding to the written-back cache entry CHE from the write back wait queue WBQ in step S721.

In step S722, the controller CTRL may mark the written-back cache entry CHE as being in the clean state C.

In step S723, the controller CTRL may compare transaction ID TI2 of the head waiting entry HEAD of the write back wait queue WBQ to the transaction ID TI2 of the eviction cache entry EVT. In the illustrated example, the controller CTRL may determine that the transaction ID TI2 of the head waiting entry HEAD is equal to the transaction ID TI2 of the eviction cache entry EVT.

In step S724, the controller CTRL may perform the write back operation WTBACK on the eviction cache entry EVT. That is, the controller CTRL may store the data DT2 in the nonvolatile memory NVM.

In step S725, the controller CTRL may compare an address AD50 of the head waiting entry HEAD to the address AD20 of the eviction cache entry EVT. In other words, the controller CTRL may determine whether the head waiting entry HEAD corresponds to the eviction cache entry EVT. The controller CTRL may perform this operation to determine whether to dequeue the head waiting entry HEAD from the write back wait queue WBQ, after performing the write back operation WTBACK on the eviction cache entry EVT. In the illustrated example, the controller CTRL may determine that the address AD50 of the head waiting entry HEAD is different from the address AD20 of the eviction cache entry EVT. In other words, the controller CTRL may determine that the head waiting entry HEAD does not correspond to the eviction cache entry EVT. Therefore, the controller CTRL may not dequeue the head waiting entry HEAD from the write back wait queue WBQ.

Then, referring to FIG. 7C, the controller CTRL may perform the read operation RD to read the target data DT3 corresponding to the target address AD30 from the nonvolatile memory NVM, in step S731.

In step S732, the controller CTRL may store the target address AD30 and the target data DT3 in the empty cache area in which the eviction cache entry EVT had been stored. In the corresponding cache area, the target cache entry TGE including the target address AD30 is stored.

In step S733, the controller CTRL may transmit the target data DT3, included in the target cache entry TGE, to the host HOST.

As a result, a cache entry CHE2 corresponding to the head waiting entry HEAD may not be written back before the eviction cache entry EVT, because the cache entry CHE2 corresponds to the same transaction as the eviction cache entry EVT even though the write order of the cache entry CHE2 leads the write order of the eviction cache entry EVT. As the write back operation on the cache entry CHE2 is postponed, the overhead of the memory system 10 may be reduced.

FIG. 7A illustrates the situation in which it is determined in step S715 that the transaction ID TI1 of the head waiting entry HEAD is different from the transaction ID TI2 of the eviction cache entry EVT. However, when it is determined in step S715 that the transaction ID of the head waiting entry HEAD is equal to the transaction ID TI2 of the eviction cache entry EVT, the procedure may be performed in the same manner from step S724 following step S715.

FIGS. 8A to 8D are diagrams illustrating an operating process of the memory system 10 in case of a write miss WTMISS in accordance with an embodiment.

Figure 8A:
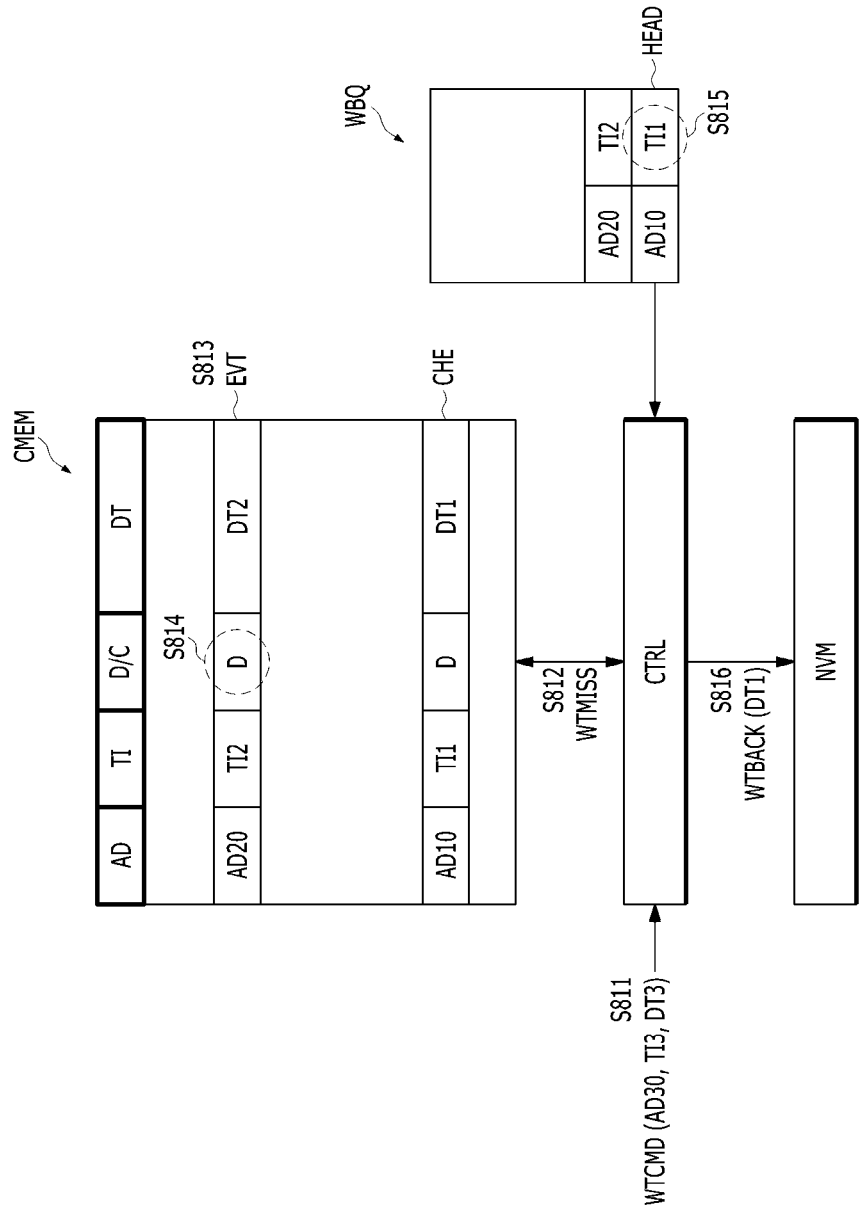
FIGS. 8A, 8B, 8C, and 8D illustrate an operating process of the memory system in case of a write miss in accordance with an embodiment.

Referring to FIG. 8A, the controller CTRL may receive the write command WTCMD from the host HOST in step S811. The write command WTCMD may correspond to the target address AD30 and the target data DT3. Furthermore, the write command WTCMD may correspond to a transaction ID TI3.

In step S812, the controller CTRL may determine that the write miss WTMISS occurred when a target cache entry including the target address AD30 is not present in the cache memory CMEM. In the example of FIGS. 8A to 8D, it is assumed that the cache memory CMEM is full.

In step S813, the controller CTRL may select an eviction cache entry EVT according to the eviction policy.

In step S814, the controller CTRL may determine that the eviction cache entry EVT is in the dirty state D by referring to the dirty/clean-state mark D/C of the eviction cache entry EVT. Therefore, the controller CTRL may determine to perform the write back operation WTBACK on the eviction cache entry EVT.

In step S815, the controller CTRL may compare the transaction ID TI1 of the head waiting entry HEAD of the write back wait queue WBQ to the transaction ID TI2 of the eviction cache entry EVT. That is, in order to maintain the write order of transactions, the controller CTRL may refer to the write back wait queue WBQ before writing back the eviction cache entry EVT. In the illustrated example, the controller CTRL may determine that the transaction ID TI1 of the head waiting entry HEAD is different from the transaction ID TI2 of the eviction cache entry EVT.

Accordingly, in step S816, the controller CTRL may perform the write back operation WTBACK on the cache entry CHE corresponding to the head waiting entry HEAD. That is, the controller CTRL may store the data DT1 in the nonvolatile memory NVM.

Figure 8B:
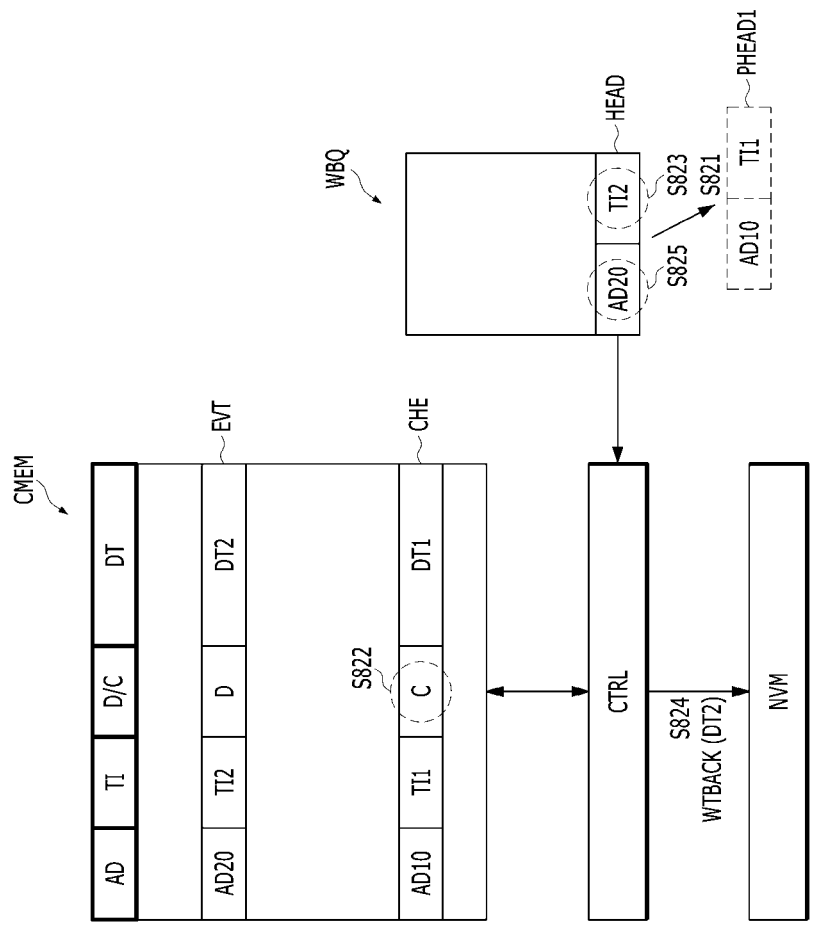

Referring to FIG. 8B, the controller CTRL may then dequeue a head waiting entry PHEAD1 corresponding to the written-back cache entry CHE from the write back wait queue WBQ in step S821.

In step S822, the controller CTRL may mark the written-back cache entry CHE as being in the clean state C.

In step S823, the controller CTRL may compare the transaction ID TI2 of the head waiting entry HEAD of the write back wait queue WBQ to the transaction ID TI2 of the eviction cache entry EVT. That is, in order to maintain the write order of transactions, the controller CTRL may refer to the write back wait queue WBQ before writing back the eviction cache entry EVT. In the illustrated example, the controller CTRL may determine that the transaction ID TI2 of the head waiting entry HEAD is equal to the transaction ID TI2 of the eviction cache entry EVT.

In step S824, the controller CTRL may perform the write back operation WTBACK on the eviction cache entry EVT. That is, the controller CTRL may store the data DT2 in the nonvolatile memory NVM.

In step S825, the controller CTRL may compare the address AD20 of the head waiting entry HEAD to the address AD20 of the eviction cache entry EVT. In other words, the controller CTRL may determine whether the head waiting entry HEAD corresponds to the eviction cache entry EVT. The controller CTRL may perform this operation to determine whether to dequeue the head waiting entry HEAD from the write back wait queue WBQ, after performing the write back operation WTBACK on the eviction cache entry EVT. In the illustrated example, the controller CTRL may determine that the address AD20 of the head waiting entry HEAD is equal to the address AD20 of the eviction cache entry EVT. In other words, the controller CTRL may determine that the head waiting entry HEAD corresponds to the eviction cache entry EVT.

Figure 8C:
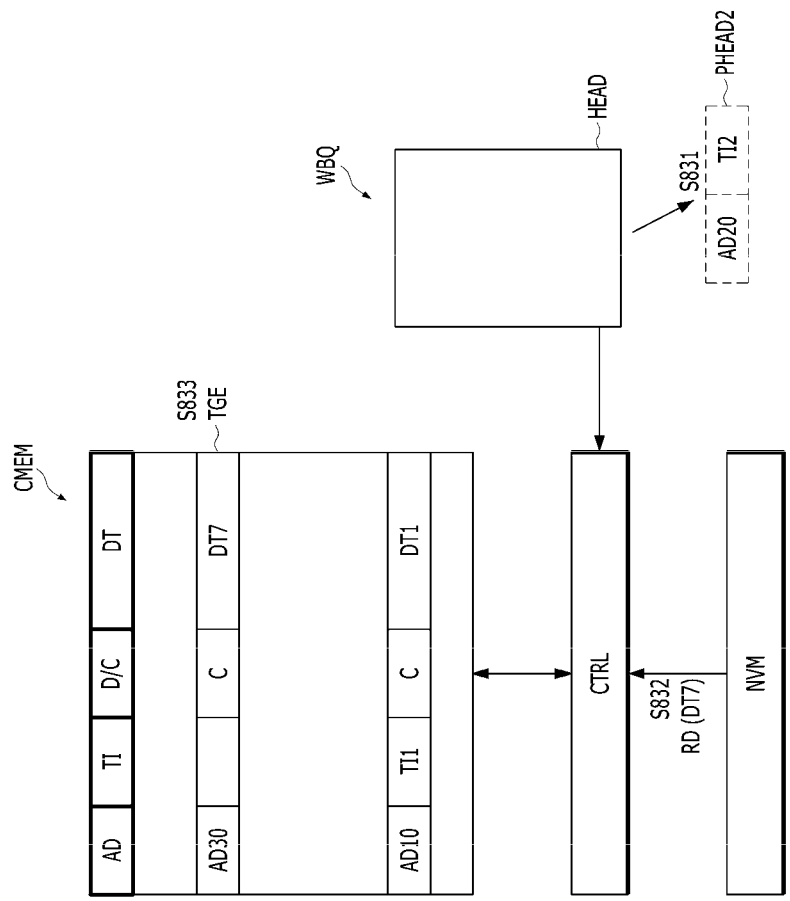

Then, referring to FIG. 8C, the controller CTRL may dequeue a head waiting entry PHEAD2 corresponding to the written-back eviction cache entry EVT from the write back wait queue WBQ in step S831.

In step S832, the controller CTRL may perform the read operation RD to read data DT7 corresponding to the target address AD30 from the nonvolatile memory NVM.

In step S833, the controller CTRL may store the target address AD30 and the data DT7 in the empty cache area in which the eviction cache entry EVT had been stored. In the corresponding cache area, the target cache entry TGE including the target address AD30 is stored.

Figure 8D:
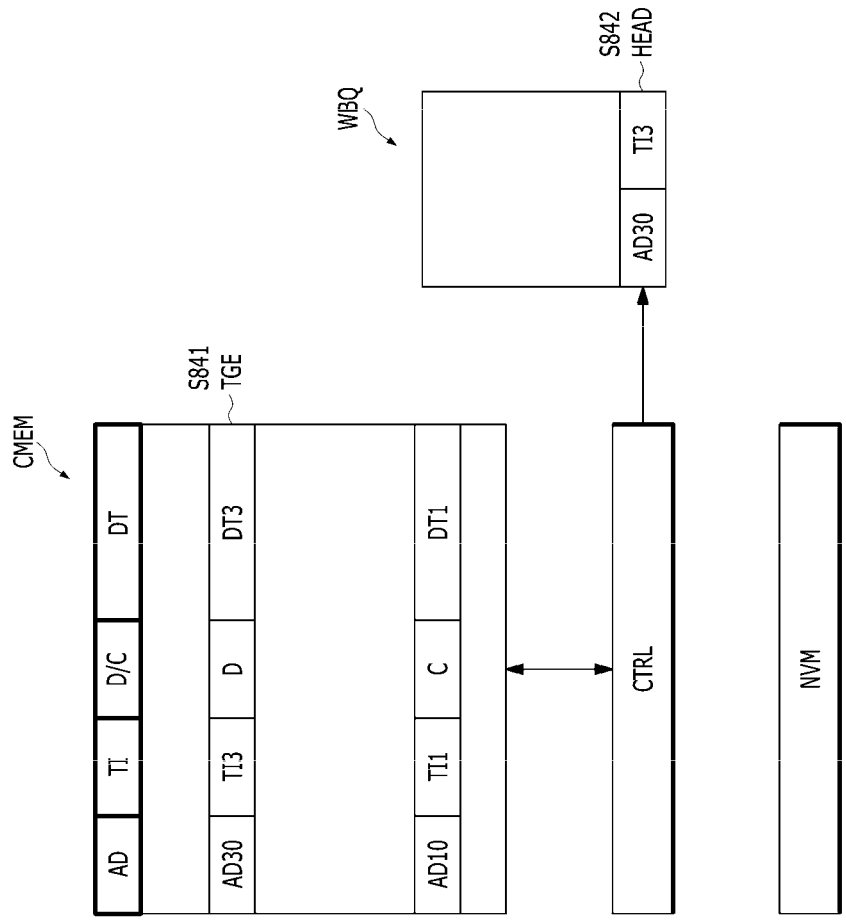

Then, referring to FIG. 8D, the controller CTRL may replace some or all of the data DT7 of the target cache entry TGE with the target data DT3, and mark the target cache entry TGE as being in the dirty state D, in step S841. The controller CTRL may also store the transaction ID TI3 in the cache area of the target cache entry TGE.

In step S842, the controller CTRL may enqueue the waiting entry HEAD corresponding to the target cache entry TGE into the write back wait queue WBQ. The waiting entry HEAD may include the target address AD30 and the transaction ID TI3.

FIG. 8A illustrates the situation in which it is determined in step S815 that the transaction ID TI1 of the head waiting entry HEAD is different from the transaction ID TI2 of the eviction cache entry EVT. However, when it is determined in step S815 that the transaction ID of the head waiting entry HEAD is equal to the transaction ID TI2 of the eviction cache entry EVT, the procedure may be performed in the same manner from step S824 following step S815.

FIGS. 9A to 9D are diagrams illustrating an operating process of the memory system 10 in case of a write miss WTMISS in accordance with an embodiment.

Figure 9A:
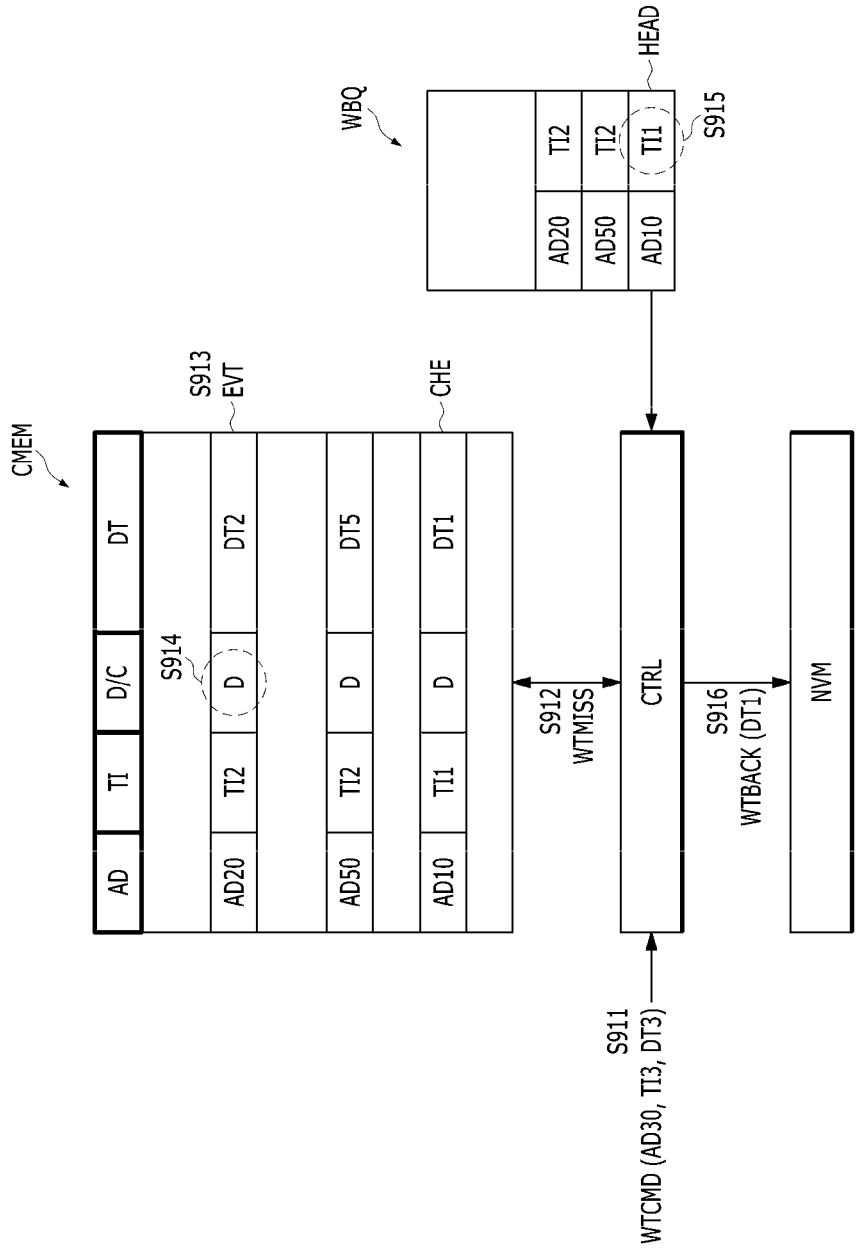
FIGS. 9A, 9B, 9C, and 9D illustrate an operating process of the memory system in case of a write miss in accordance with an embodiment.

Referring to FIG. 9A, the controller CTRL may receive the write command WTCMD from the host HOST in step S911. The write command WTCMD may correspond to the target address AD30 and the target data DT3. Furthermore, the write command WTCMD may correspond to the transaction ID TI3.

In step S912, the controller CTRL may determine that the write miss WTMISS occurred when a target cache entry including the target address AD30 is not present in the cache memory CMEM. In the example of FIGS. 9A to 9D, it is assumed that the cache memory CMEM is full.

In step S913, the controller CTRL may select the eviction cache entry EVT according to the eviction policy.

In step S914, the controller CTRL may determine that the eviction cache entry EVT is in the dirty state D, by referring to the dirty/clean-state mark D/C of the eviction cache entry EVT. Therefore, the controller CTRL may determine to perform the write back operation WTBACK on the eviction cache entry EVT.

In step S915, the controller CTRL may compare the transaction ID TI1 of the head waiting entry HEAD of the write back wait queue WBQ to the transaction ID TI2 of the eviction cache entry EVT. That is, in order to maintain the write order of transactions, the controller CTRL may refer to the write back wait queue WBQ before writing back the eviction cache entry EVT. In the illustrated example, the controller CTRL may determine that the transaction ID TI1 of the head waiting entry HEAD is different from the transaction ID TI2 of the eviction cache entry EVT.

Accordingly, in step S916, the controller CTRL may perform the write back operation WTBACK on the cache entry CHE corresponding to the head waiting entry HEAD. That is, the controller CTRL may store the data DT1 in the nonvolatile memory NVM.

Figure 9B:
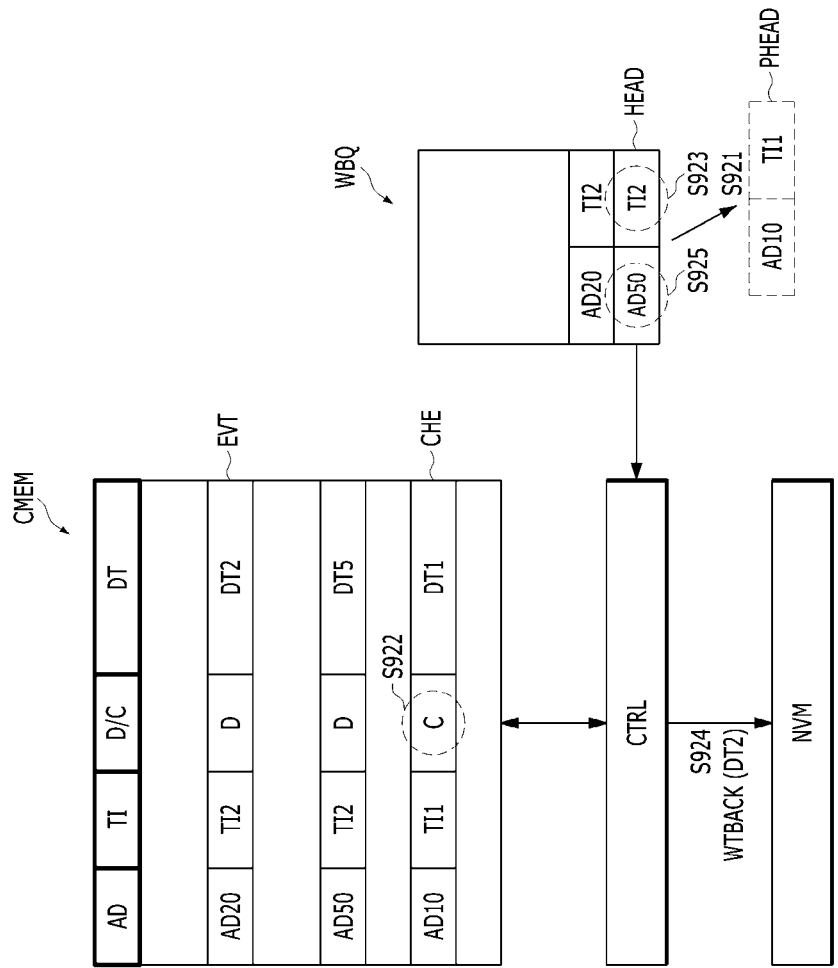

Then, referring to FIG. 9B, the controller CTRL may dequeue a head waiting entry PHEAD corresponding to the written-back cache entry CHE from the write back wait queue WBQ in step S921.

In step S922, the controller CTRL may mark the written-back cache entry CHE as being in the clean state C.

In step S923, the controller CTRL may compare the transaction ID TI2 of the head waiting entry HEAD of the write back wait queue WBQ to the transaction ID TI2 of the eviction cache entry EVT. In the illustrated example, the controller CTRL may determine that the transaction ID TI2 of the head waiting entry HEAD is equal to the transaction ID TI2 of the eviction cache entry EVT.

In step S924, the controller CTRL may perform the write back operation WTBACK on the eviction cache entry EVT. That is, the controller CTRL may store the data DT2 in the nonvolatile memory NVM.

In step S925, the controller CTRL may compare the address AD50 of the head waiting entry HEAD to the address AD20 of the eviction cache entry EVT. In other words, the controller CTRL may determine whether the head waiting entry HEAD corresponds to the eviction cache entry EVT. The controller CTRL may perform this operation to determine whether to dequeue the head waiting entry HEAD from the write back wait queue WBQ, after performing the write back operation WTBACK on the eviction cache entry EVT. In the illustrated example, the controller CTRL may determine that the address AD50 of the head waiting entry HEAD is different from the address AD20 of the eviction cache entry EVT. In other words, the controller CTRL may determine that the head waiting entry HEAD does not correspond to the eviction cache entry EVT. Therefore, the controller CTRL may not dequeue the head waiting entry HEAD from the write back wait queue WBQ.

Figure 9C:
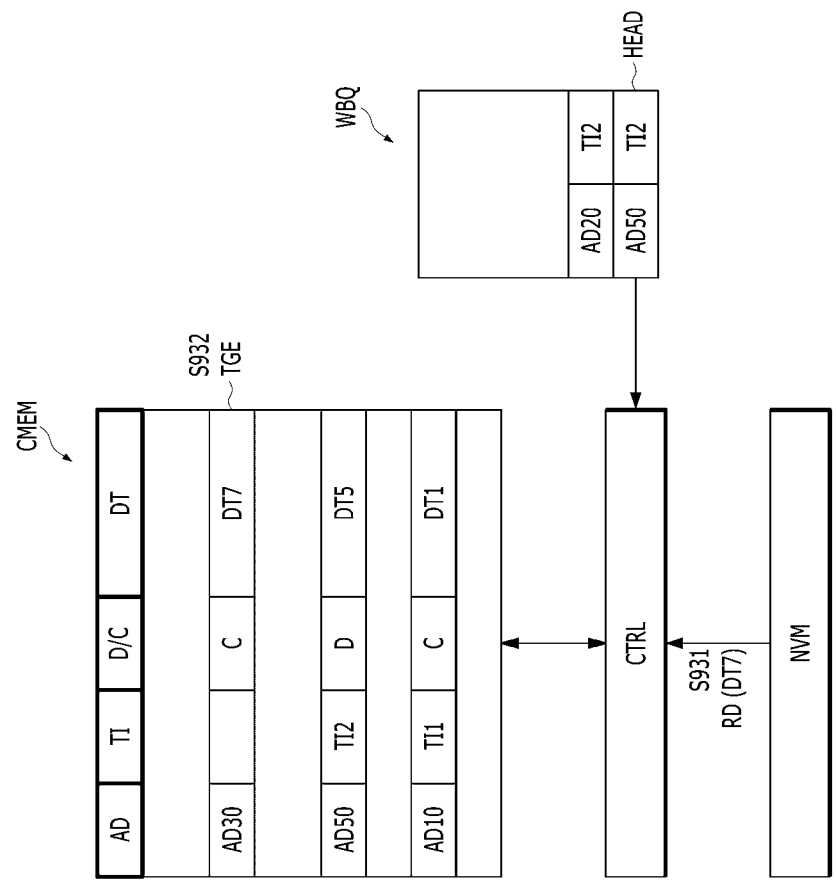

Then, referring to FIG. 9C, the controller CTRL may perform the read operation RD to read the data DT7 corresponding to the target address AD30 from the nonvolatile memory NVM, in step S931.

In step S932, the controller CTRL may store the target address AD30 and the data DT7 in the empty cache area in which the eviction cache entry EVT had been stored. In the corresponding cache area, the target cache entry TGE including the target address AD30 is stored.

Figure 9D:
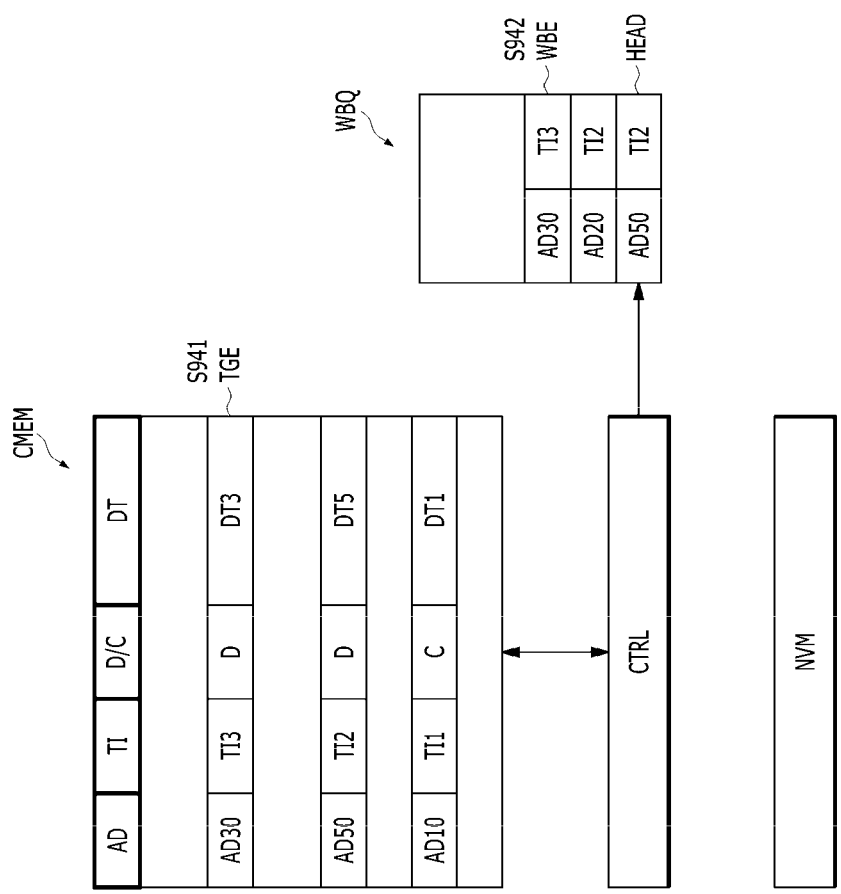

Then, referring to FIG. 9D, the controller CTRL may replace some or all of the data DT7 of the target cache entry TGE with the target data DT3 and mark the target cache entry TGE as being in the dirty state D, in step S941. The controller CTRL may also store the transaction ID TI3 in the cache area of the target cache entry TGE.

In step S942, the controller CTRL may enqueue a waiting entry WBE corresponding to the target cache entry TGE into the write back wait queue WBQ. The waiting entry WBE may include the target address AD30 and the transaction ID TI3.

FIG. 9A illustrates the situation in which it is determined in step S915 that the transaction ID TI1 of the head waiting entry HEAD is different from the transaction ID TI2 of the eviction cache entry EVT. However, when it is determined in step S915 that the transaction ID of the head waiting entry HEAD is equal to the transaction ID TI2 of the eviction cache entry EVT, the procedure may be performed in the same manner from step S924 following step S915.

Figure 10:
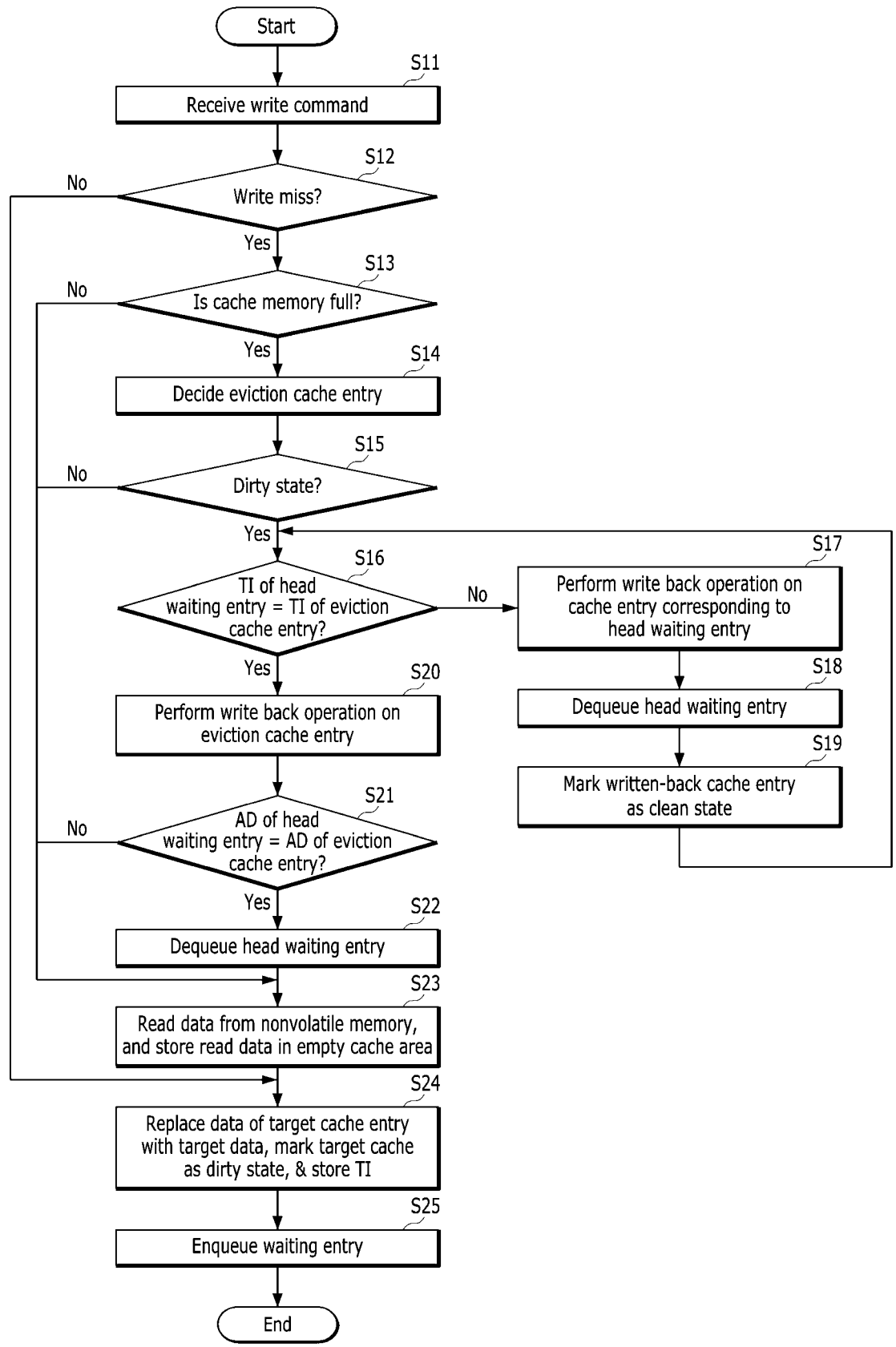
FIG. 10 illustrates an operating procedure of the memory system of FIG. 1 in accordance with an embodiment.

FIG. 10 is a flowchart illustrating an operation procedure of the memory system 10 of FIG. 1 in accordance with an embodiment.

Referring to FIG. 10, the controller CTRL may receive a write command from the host HOST in step S11.

In step S12, the controller CTRL may determine whether a write miss for the write command occurred. When the write miss occurred, the procedure may proceed to step S13. When a write hit occurred, the procedure may proceed to step S24.

In step S13, the controller CTRL may determine whether the cache memory CMEM is full. When the cache memory CMEM is full, the procedure may proceed to step S14. When the cache memory CMEM is not full, the procedure may proceed to step S23.

In step S14, the controller CTRL may select an eviction cache entry in the cache memory CMEM.

In step S15, the controller CTRL may determine whether the eviction cache entry is in a dirty state, by referring to the dirty/clean-state mark of the eviction cache entry. When the eviction cache entry is in the dirty state, the procedure may proceed to step S16. When the eviction cache entry is in a clean state, the procedure may proceed to step S23.

In step S16, the controller CTRL may determine whether the transaction ID of the head waiting entry of the write back wait queue WBQ is equal to the transaction ID of the eviction cache entry. When the transaction ID of the head waiting entry is equal to the transaction ID of the eviction cache entry, the procedure may proceed to step S20. When the transaction ID of the head waiting entry is different from the transaction ID of the eviction cache entry, the procedure may proceed to step S17.

In step S17, the controller CTRL may perform a write back operation on the cache entry corresponding to the head waiting entry.

In step S18, the controller CTRL may dequeue a head waiting entry corresponding to the written-back cache entry from the write back wait queue.

In step S19, the controller CTRL may mark the written-back cache entry as being in the clean state C. The procedure may then proceed to step S16.

In step S20, the controller CTRL may perform the write back operation on the eviction cache entry.

In step S21, the controller CTRL may determine whether the address of the head waiting entry is equal to the address of the eviction cache entry. When the address of the head waiting entry is equal to the address of the eviction cache entry, the procedure may proceed to step S22. When the address of the head waiting entry is different from the address of the eviction cache entry, the procedure may proceed to step S23.

In step S22, the controller CTRL may dequeue the head waiting entry from the write back wait queue.

In step S23, the controller CTRL may read data corresponding to the target address from the nonvolatile memory, and store the read data in an empty cache area.

In step S24, the controller CTRL may replace some or all of data of the target cache entry with the target data, and mark the target cache entry as being in the dirty state. Furthermore, the controller CTRL may also store the transaction ID corresponding to the write command in the cache area of the target cache entry.

In step S25, the waiting entry corresponding to the target cache entry may be enqueued into the write back wait queue WBQ. The waiting entry may include the target address and the transaction ID corresponding to the write command.

Figure 11:
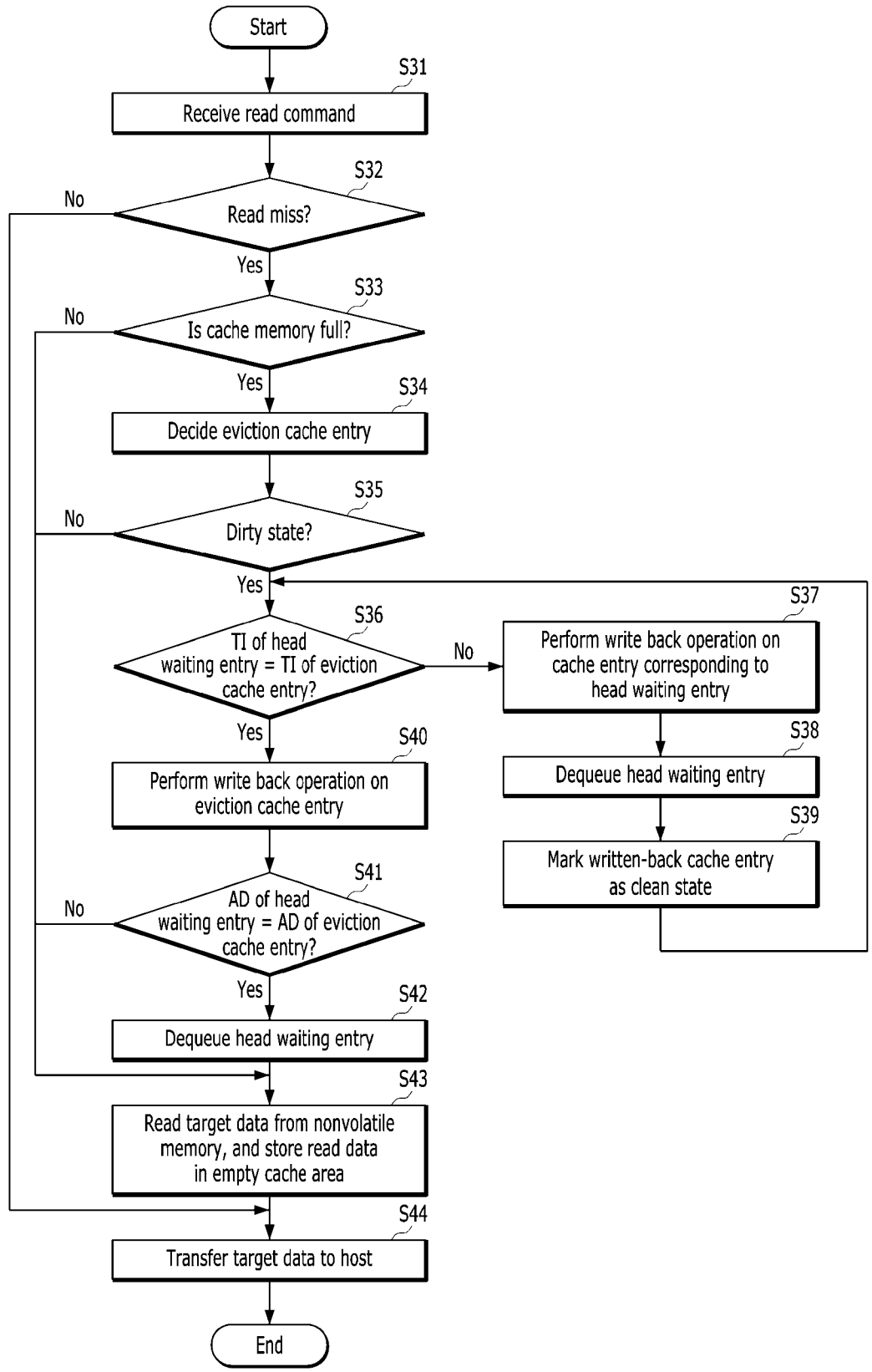
FIG. 11 illustrates an operating procedure of the memory system of FIG. 1 in accordance with an embodiment.

FIG. 11 is a flowchart illustrating an operation procedure of the memory system 10 of FIG. 1 in accordance with an embodiment.

Referring to FIG. 11, the controller CTRL may receive a read command from the host HOST in step S31.

In step S32, the controller CTRL may determine whether a read miss for the read command occurred. When the read miss occurred, the procedure may proceed to step S33. When a read hit occurred, the procedure may proceed to step S44.

Steps S33 to S42 may be performed in substantially the same manner as steps S13 to S22 of FIG. 10.

In step S43, the controller CTRL may read target data corresponding to the target address from the nonvolatile memory, and store the read target data in an empty cache area. When an eviction cache entry was selected at S34, the empty cache area may correspond to the eviction cache area.

In step S44, the controller CTRL may transmit the target data, stored in the cache memory CMEM, to the host HOST.

While various embodiments have been described above, it will be understood to those skilled in the art that the embodiments described are examples only. Accordingly, the memory system described herein should not be limited based on the described embodiments.

What is claimed is:

1. A memory system comprising:
a cache memory configured to store a plurality of cache entries;
a nonvolatile memory; and
a controller configured to evict from the cache memory an eviction cache entry having a target transaction ID by:
when a first waiting entry at a head of a write back wait queue includes a transaction ID that is different from the target transaction ID, performing a write back operation to the nonvolatile memory on a cache entry corresponding to the first waiting entry, and
when the first waiting entry at the head of the write back wait queue includes the transaction ID equal to the target transaction ID, performing a write back operation to the nonvolatile memory on the eviction cache entry.

2. The memory system according to claim 1, wherein performing the write back operation on the cache entry corresponding to the first waiting entry comprises dequeuing the first waiting entry from the write back wait queue.

3. The memory system according to claim 2, wherein the controller updates the cache entry corresponding to the first waiting entry to have a clean state after performing the write back operation on the cache entry corresponding to the first waiting entry.

4. The memory system according to claim 2, wherein performing the write back operation on the cache entry corresponding to the first waiting entry further comprises:
after dequeuing the first waiting entry, performing a write-back operation on a cache entry corresponding to a second waiting entry at the head of the write back wait queue when a transaction ID of the second waiting entry is different from the target transaction ID.

5. The memory system according to claim 1, wherein performing the write back operation on the eviction cache entry comprises performing the write back operation on the eviction cache entry before performing the write back operation on the first waiting entry when a waiting entry corresponding to the eviction cache entry is queued in the write back wait queue after the first waiting entry.

6. The memory system according to claim 1, wherein performing the write back operation on the eviction cache entry comprises dequeuing the first waiting entry from the write back wait queue when an address of the first waiting entry is equal to an address of the eviction cache entry.

7. The memory system according to claim 1, wherein the controller is configured to perform the write back operation on the eviction cache entry in response to determining that the eviction cache entry is in a dirty state.

8. The memory system according to claim 1, wherein the controller is further configured to:
receive a command, and determine the eviction cache entry when a cache miss for the command occurs in the cache memory.

9. The memory system according to claim 1, wherein the controller is further configured to:
in response to receiving a write command, store a target cache entry in the cache memory and enqueue a waiting entry corresponding to the target cache entry into the write back wait queue,
wherein each of the target cache entry and the waiting entry comprises a transaction ID and an address of the write command.

10. A memory system comprising:
a cache memory configured to store a plurality of cache entries;
a nonvolatile memory configured to store data; and
a controller configured to, in response to a command:
perform a comparison operation comprising comparing a transaction ID of a first waiting entry at a head of a write back wait queue to a transaction ID of an eviction cache entry of the cache memory,
perform a cache entry determination comprising determining a cache entry in the cache memory according to the comparison result, and
perform a write back operation comprising performing the write back operation to the nonvolatile memory on the determined cache entry.

11. The memory system according to claim 10, wherein performing the cache entry determination further comprises:
when the transaction ID of the first waiting entry is different from the transaction ID of the eviction cache entry, determining a cache entry corresponding to the first waiting entry as the determined cache entry.

12. The memory system according to claim 11, wherein performing the write back operation further comprises dequeuing the first waiting entry from the write back wait queue when the determined cache entry corresponds to the first waiting entry.

13. The memory system according to claim 11, wherein the controller is further configured to, in response to the command, repeatedly performs the comparison operation, the cache entry determination operation and the write back operation on successive waiting entries at the head of the write back wait queue.

14. The memory system according to claim 11, wherein performing the write back operation further comprises marking the determined cache entry as being in a clean state when the determined cache entry corresponds to the first waiting entry.

15. The memory system according to claim 10, wherein performing the cache entry determination further comprises determining the eviction cache entry as the determined cache entry when the transaction ID of the first waiting entry is equal to the transaction ID of the eviction cache entry.

16. The memory system according to claim 15, wherein performing the write back operation further comprises dequeuing the first waiting entry from the write back wait queue after performing the write back operation on the eviction cache entry when an address of the first waiting entry is equal to an address of the eviction cache entry.

17. A memory system comprising:
a cache memory configures to store a plurality of cache entries;
a nonvolatile memory; and
a controller configured to:
enqueue a waiting entry corresponding to a cache entry into a write back wait queue when storing the cache entry in the cache memory in response to a write command, and
perform a write back operation on the cache entry based on the write back wait queue,
wherein each of the cache entry and the waiting entry comprises a transaction ID of the write command, and
wherein the controller is further configured to:
when one or more waiting entries at a head of the write back wait queue have respective transaction IDs different from a transaction ID of an eviction cache entry of the cache memory, perform write back operations on one or more cache entries respectively corresponding to the one or more waiting entries and dequeue the one or more waiting entries from the write back wait queue until a transaction ID of the head waiting entry becomes equal to a transaction ID of an eviction cache entry of the cache memory.

18. The memory system according to claim 17, wherein performing the write back operation on the cache entry based on the write back wait queue includes performing the write back operation on the eviction cache entry when the transaction ID of the head waiting entry of the write back wait queue is equal to the transaction ID of the eviction cache entry.

19. The memory system according to claim 18, wherein performing the write back operation on the eviction cache entry includes dequeuing the head waiting entry from the write back wait queue when an address of the head waiting entry is equal to an address of the eviction cache entry.

* * * * *